United States Patent
Galitsky

(10) Patent No.: US 11,580,298 B2
(45) Date of Patent: Feb. 14, 2023

(54) DETECTING HYPOCRISY IN TEXT

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 273 days.

(21) Appl. No.: 17/084,116

(22) Filed: Oct. 29, 2020

(65) Prior Publication Data

US 2021/0150140 A1     May 20, 2021

Related U.S. Application Data

(60) Provisional application No. 62/935,328, filed on Nov. 14, 2019.

(51) Int. Cl.
| | |
|---|---|
| G06F 40/211 | (2020.01) |
| G06F 40/30 | (2020.01) |
| G06F 16/953 | (2019.01) |
| G06F 16/901 | (2019.01) |
| G06N 20/00 | (2019.01) |

(52) U.S. Cl.
CPC ........ G06F 40/211 (2020.01); G06F 16/9027 (2019.01); G06F 16/953 (2019.01); G06F 40/30 (2020.01); G06N 20/00 (2019.01)

(58) Field of Classification Search
CPC .. G06F 40/211; G06F 16/953; G06F 16/9027; G06F 40/30; G06N 20/00
See application file for complete search history.

(56) References Cited

U.S. PATENT DOCUMENTS

| | | | |
|---|---|---|---|
| 6,112,168 | A | 8/2000 | Corston et al. |
| 6,961,692 | B1 | 11/2005 | Polanyi et al. |
| 7,013,259 | B1 | 3/2006 | Polanyi et al. |

(Continued)

FOREIGN PATENT DOCUMENTS

| | | |
|---|---|---|
| JP | 2001-523019 A | 11/2001 |
| JP | 2005-122743 A | 5/2005 |
| WO | 9921104 A1 | 4/1999 |

OTHER PUBLICATIONS

U.S. Appl. No. 16/408,224, Notice of Allowance dated Jan. 7, 2022, 9 pages.

(Continued)

*Primary Examiner* — Vijay B Chawan
(74) *Attorney, Agent, or Firm* — Kilpatrick Townsend & Stockton LLP

(57) ABSTRACT

Techniques are disclosed for identifying hypocrisy in text. A computer system creates, from fragments of text, a syntactic tree that represents syntactic relationships between words in the fragments. The system identifies, in the syntactic tree, a first entity and a second entity. The system further determines that the first entity is opposite to the second entity. The system further determines a first sentiment score for a first fragment comprising the first entity and a second sentiment score for a second fragment comprising the second entity. The system, responsive to determining that the first sentiment score and the second sentiment score indicate opposite emotions, identifies the text as comprising hypocrisy and providing the text to an external device.

9 Claims, 24 Drawing Sheets

(56) References Cited

U.S. PATENT DOCUMENTS

| | | | |
|---|---|---|---|
| 9,171,037 B2 | 10/2015 | Galitsky et al. | |
| 9,201,860 B1* | 12/2015 | Zhang | G06F 40/30 |
| 9,201,868 B1* | 12/2015 | Zhang | G06F 40/40 |
| 2002/0046018 A1 | 4/2002 | Marcu et al. | |
| 2002/0107851 A1* | 8/2002 | Beauchamp | G06Q 30/06 707/999.005 |
| 2003/0138758 A1 | 7/2003 | Burstein et al. | |
| 2004/0044519 A1 | 3/2004 | Polanyi et al. | |
| 2004/0158452 A1 | 8/2004 | Polanyi et al. | |
| 2004/0158453 A1 | 8/2004 | Polanyi et al. | |
| 2005/0267871 A1* | 12/2005 | Marchisio | G06F 16/3338 |
| 2007/0106499 A1* | 5/2007 | Dahlgren | G06F 16/243 704/10 |
| 2007/0143098 A1 | 6/2007 | van den Berg et al. | |
| 2011/0282856 A1* | 11/2011 | Ganti | G06F 40/247 707/706 |
| 2012/0254333 A1* | 10/2012 | Chandramouli | G06F 40/10 709/206 |
| 2013/0103386 A1* | 4/2013 | Zhang | G06F 40/30 704/9 |
| 2014/0114649 A1* | 4/2014 | Zuev | G06F 16/93 704/9 |
| 2015/0081277 A1 | 3/2015 | Behi | |
| 2015/0161200 A1* | 6/2015 | Barba | G06F 16/24 705/313 |
| 2015/0262393 A1* | 9/2015 | Bliss | G06T 11/20 345/441 |
| 2015/0278198 A1* | 10/2015 | Andreev | G06F 40/268 704/9 |
| 2016/0098394 A1* | 4/2016 | Bruno | G06F 40/30 704/9 |
| 2016/0275573 A1* | 9/2016 | L'Huillier | G06Q 30/0282 |
| 2016/0371321 A1* | 12/2016 | Myslinski | G06Q 30/0241 |
| 2017/0060831 A1* | 3/2017 | Smythe | G06F 40/289 |
| 2017/0358295 A1 | 12/2017 | Roux et al. | |
| 2018/0052818 A1 | 2/2018 | Bethard et al. | |
| 2018/0329880 A1 | 11/2018 | Galitsky | |
| 2018/0357221 A1 | 12/2018 | Galitsky | |
| 2018/0365228 A1* | 12/2018 | Galitsky | G06F 40/30 |
| 2019/0005027 A1 | 1/2019 | He et al. | |
| 2019/0095420 A1 | 3/2019 | Galitsky | |
| 2019/0295537 A1* | 9/2019 | Sapugay | G06F 40/30 |
| 2019/0370604 A1 | 12/2019 | Galitsky | |
| 2019/0371299 A1 | 12/2019 | Jiang et al. | |
| 2020/0012720 A1 | 1/2020 | Elson et al. | |
| 2020/0151777 A1* | 5/2020 | Casalino | G06F 40/30 |

OTHER PUBLICATIONS

Galitsky et al, On a Chat Bot Finding Answers with Optimal Rhetoric Representation, Proceedings of Recent Advances in Natural Language Processing, Sep. 2017, p. 253-359, 2017.

Verberne et al., Discourse-based answering of why questions, TAL vol. 47, 21-41, 2007.

Sadek et al., A Discourse-Based Approach for Arabic Question Answering, ACM Trans. Asian Low-Resour. Lang. Inf. Process., vol. 16, No. 2, Article 11, Nov. 2016, whole document, 2016.

Sadek et al., Arabic Rhetorical Relations Extraction for Answering Why and How to Questions, G. Bouma et al. (Eds.): NLDB 2012, LNCS 7337, pp. 385-390, 2012.

U.S. Appl. No. 16/408,224, Supplemental Notice of Allowance dated Feb. 15, 2022, 6 pages.

U.S. Appl. No. 16/995,302, Notice of Allowance dated Jan. 7, 2022, 11 pages.

Galitsky, et al, "Rhetoric map of an answer to compound queries." Proceedings of the 53rd Annual Meeting of the Association for Computational Linguistics and the 7th International Joint Conference on Natural Language Processing (vol. 2: Short Papers). 2015. (Year: 2015).

Galitsky, et al, "Matching sets of parse trees for answering multi-sentence questions." In Proceedings of the International Conference Recent Advances in Natural Language Processing RANLP 2013, pp. 285-293, Hissar, Bulgaria. INCOMA Ltd. Shoumen, Bulgaria.

U.S. Appl. No. 16/902,015, First Action Interview Pilot Program Pre-Interview Communication dated Jan. 21, 2022, 5 pages.

U.S. Appl. No. 16/902,015, First Action Interview Office Action Summary dated Mar. 11, 2022, 5 pages.

Galitsky, "Discovering Rhetorical Agreement between a Request and Response", Dialogue and Discourse, Dec. 2017, pp. 167-205 (Year: 2017).

Galitsky et al., "Building Dialogue Structure from Discourse Tree of a Question", Proceedings of the 2018 EMNLP Workshop SCAI: The 2nd International Workshop on Search-Oriented Conversational AI, Oct. 31, 2018, pp. 17-23.

Galitsky et al., "Chatbot Components and Architectures", In Developing Enterprise Chatbots, Springer, 2019, pp. 13-47.

Galitsky et al., "Detecting Logical Argumentation in Text via Communicative Discourse Tree", Journal of Experimental & Theoretical Artificial Intelligence, vol. 30, No. 5, May 2018, 29 pages.

Galitsky et al., "Discourse-Based Approach to Involvement of Background Knowledge for Question Answering", Proceedings of the International Conference on Recent Advances in Natural Language Processing, Sep. 2-4, 2019, pp. 373-381.

Galitsky et al., "Extending Tree Kernels Towards Paragraphs", International Journal of Computational Linguistics and Applications, vol. 5, No. 1, Jan.-Jun. 2014, pp. 105-116.

Galitsky et al., "On a Chatbot Conducting Dialogue-in-Dialogue", Proceedings of the 20th Annual SIGdial Meeting on Discourse and Dialogue, Sep. 2019, pp. 118-121.

Galitsky et al., "On a Chatbot Conducting Virtual Dialogues", CIKM '19: Proceedings of the 28th ACM International Conference on Information and Knowledge Management, Nov. 3-7, 2019, 4 pages.

Galitsky et al., "Programming Spatial Algorithms in Natural Language", Natural Language Processing, Available Online at https://www.researchgate.net/publication/255598711_Programming_Spatial_Algorithms_in_Natural_Language, Jan. 2008, pp. 16-23.

Galitsky, "Providing Personalized Recommendation for Attending Events Based on Individual Interest Profiles", Artificial Intelligence Research, vol. 5, No. 1, Sep. 2015, 37 pages.

Anelli et al., "Knowledge-Aware and Conversational Recommender Systems", Proceedings of the 12th ACM Conference on Recommender Systems, Sep. 2018, pp. 521-522.

Banarescu et al., "Abstract Meaning Representation forSembanking", Proceedings of the 7th Linguistic Annotation Workshop & Interoperability with Discourse, Aug. 8-9, 2013, pp. 178-186.

Bar-Haim et al., "Stance Classification of Context-Dependent Claims", Proceedings of the 15th Conference of the European Chapter of the Association for Computational Linguistics: vol. 1, Apr. 3-7, 2017, pp. 251-261.

Berkovsky et al., "Influencing Individually: Fusing Personalization and Persuasion", ACM Transactions on Interactive Intelligent Systems, vol. 2, No. 2, Article 9, Jun. 2012, 8 pages.

Bernard et al., "The Power of Well-Connected Arguments: Early Sensitivity to the Connective Because", Journal of Experimental Child Psychology, vol. 111, 2012, pp. 128-135.

Bolshakov et al., "Synonymous Paraphrasing Using WordNet and Internet", Department of Computer Science and Engineering, Chung-Ang University, Seoul, Jan. 1970, 12 pages.

Bridge, "Towards Conversational Recommender Systems: A Dialogue Grammar Approach", Conference: 6th European Conference on Case Based Reasoning, ECCBR 2002, Jan. 2002, pp. 9-22.

Budanitsky et al., "Evaluating WordNet-Based Measures of Lexical Semantic Relatedness", Computational Linguistics, vol. 32, No. 1, Mar. 2006, pp. 13-47.

Budzianowski et al., "MultiWOZ—A Large-Scale Multi-Domain Wizard-of-Oz Dataset for Task-Oriented Dialogue Modelling", Proceedings of the 2018 Conference on Empirical Methods in Natural Language Processing, Oct. 31-Nov. 4, 2018, pp. 5016-5026.

Cabrio et al., "A Natural Language Bipolar Argumentation Approach to Support Users in Online Debate Interactions", Argument and Computation, vol. 4, No. 3, 2013, pp. 209-230.

(56) References Cited

OTHER PUBLICATIONS

Chen et al., "Critiquing-Based Recommenders: Survey and Emerging Trends", User Modeling and User-Adapted Interaction, vol. 22, Nos. 1-2, Apr. 2012, pp. 125-150.

Cheng et al., "Joint Training for Pivot-Based Neural Machine Translation", Proceedings of the Twenty-Sixth International Joint Conference on Artificial Intelligence (IJCAI-17), Feb. 21, 2017, 7 pages.

Christakopoulou et al., "Towards Conversational Recommender Systems", KDD '16: Proceedings of the 22nd ACM SIGKDD International Conference on Knowledge Discovery and Data Mining, Aug. 2016, 10 pages.

Coulmance et al., "Trans-Gram, Fast Cross-Lingual Word-Embeddings", Available Online at: https://arxiv.org/pdf/1601.02502.pdf, Jan. 11, 2016, 8 pages.

Dagan et al., "Recognizing Textual Entailment: Rational, Evaluation and Approaches", Natural Language Engineering, vol. 15, No. 4, Oct. 2009, pp. i-xvii.

Dung, "On the Acceptability of Arguments and its Fundamental Role in Nonmonotonic Reasoning, Logic Programming and N-Person Games", Artificial Intelligence, vol. 77, No. 2, Sep. 1995, pp. 321-357.

Ellsworth et al., "Mutaphrase: Paraphrasing with FrameNet", Proceedings of the Workshop on Textual Entailment and Paraphrasing, Available Online at: http://www.icsi.berkeley.edu/pubs/speech/acl07.pdf, Jun. 2007, pp. 143-150.

Faruqui et al., "Improving Vector Space Word Representations Using Multilingual Correlation", Proceedings of the 14th Conference of the European Chapter of the Association for Computational Linguistics, Apr. 26-30, 2014, pp. 462-471.

Felfernig et al., "Developing Constraint-Based Recommenders", Recommender Systems Handbook, 2010, pp. 187-215.

Galitsky et al., "Building Integrated Opinion Delivery Environment", AI, Cognitive Semantics, Computational Linguistics and Logics @ Twenty-Fourth International FLAIRS Conference, 2011, 6 pages.

Galitsky et al., "Chatbot with a Discourse Structure-Driven Dialogue Management", Proceedings of the EACL 2017 Software Demonstrations, Apr. 3-7, 2017, pp. 87-90.

Galitsky et al., "Discourse-Level Dialogue Management", In Developing Enterprise Chatbots: Springer Nature, 2019, pp. 365-387.

Galitsky et al., "From Generalization of Syntactic Parse Trees to Conceptual Graphs", 18th International Conference on Conceptual Structures, vol. 6208, Jul. 26-30, 2010, pp. 185-190.

Galitsky et al., "Inferring the Semantic Properties of Sentences by Mining Syntactic Parse Trees", Data & Knowledge Engineering, vols. 81-82, Nov.-Dec. 2012, pp. 21-45.

Galitsky, "Matching Parse Thickets for Open Domain Question Answering", Data & Knowledge Engineering, vol. 107, Jan. 2017, pp. 24-50.

Galitsky, "Natural Language Understanding with the Generality Feedback", Discrete Mathematics and Theoretical Computer Science Technical Report 99-32, Jun. 1999, pp. 1-21.

Galitsky et al., "Using Generalization of Syntactic Parse Trees for Taxonomy Capture on the Web", ICCS, Available Online at: https://rd.springer.com/chapter/10.1007/978-3-642-22688-5_8, Jul. 2011, pp. 104-117.

Garcia-Villalba et al., "A Framework to Extract Arguments in Opinion Texts", International Journal of Cognitive Informatics and Natural Intelligence, vol. 6, No. 3, pp. 62-87, Jul.-Sep. 2012.

Glickman et al., "Web Based Probabilistic Textual Entailment", Computer Science Department, Available Online at: https://citeseerx.ist.psu.edu/viewdoc/download?doi=10.1.1.125.6555&rep=rep1&type=pdf, Jan. 2005, 4 pages.

Greenberg, "Conversational Experiences: Building Relationships One Conversation at a Time", Social CRM: The Conversation, Oct. 30, 2018, 10 pages.

Gronroos, "The Relationship Marketing Process: Communication, Interaction, Dialogue, Value", Journal of Business & Industrial Marketing, vol. 19, Issue 2, Mar. 2004, pp. 99-113.

Ibeke et al., "Extracting and Understanding Contrastive Opinion through Topic Relevant Sentences", Proceedings of the Eighth International Joint Conference on Natural Language Processing, vol. 2, Nov. 27-Dec. 1, 2017, pp. 395-400.

Jijkoun et al., "Recognizing Textual Entailment Using Lexical Similarity", Available Online at: https://u.cs.biu.ac.il/~nlp/RTE1/Proceedings/jijkoun_and_de_rijke.pdf, Jan. 2005, 4 pages.

Kostelnik et al., "Chatbots for Enterprises: Outlook", Acta Universitatis Agriculturae ET Silviculturae Mendelianae Brunensis, vol. 67, No. 6, 2019, pp. 1541-1550.

Kwiatkowski et al., "Natural Questions: A Benchmark for Question Answering Research", Transactions of the Association of Computational Linguistics, 2019, 14 pages.

Li et al., "DailyDialog: A Manually Labelled Multi-turn Dialogue Dataset", Proceedings of the Eighth International Joint Conference on Natural Language Processing, Long Papers, vol. 1, Dec. 1, 2017, pp. 986-995.

Lippi et al., "Argument Mining from Speech: Detecting Claims in Political Debates", AAAI'16: Proceedings of the Thirtieth AAAI Conference on Artificial Intelligence, Feb. 2016, pp. 2979-2985.

Logacheva et al., "ConvAI Dataset of Topic-Oriented Human-to-Chatbot Dialogues", The NIPS '17 Competition: Building Intelligent Systems, 2018, pp. 47-57.

Makhalova et al., "Information Retrieval Chatbots Based on Conceptual Models", In book: Graph-Based Representation and Reasoning, Jun. 2019, pp. 230-238.

Makhalova et al., "Pattern Structures for News Clustering", School of Applied Mathematics and Information Science, National Research University Higher School of Economics,, Jan. 2015, 8 pages.

Miceli et al., "Emotional and Non-Emotional Persuasion", Applied Artificial Intelligence, Jun. 2006, pp. 1-25.

Mikolov et al., "Efficient Estimation of Word Representations in Vector Space", Available Online at: https://arxiv.org/pdf/1301.3781.pdf, Sep. 7, 2013, 12 pages.

Mochales et al., "Argumentation Mining", Artificial Intelligence and Law, vol. 19, No. 1, Mar. 2011, pp. 1-22.

Murphy et al., "What Makes a Text Persuasive? Comparing Students' and Experts' Conceptions of Persuasiveness", International Journal of Educational Research, vol. 35, pp. 675-698, 2001.

Narducci et al., "Improving the User Experience with a Conversational Recommender System", International Conference of the Italian Association for Artificial Intelligence, 2018, pp. 528-538.

Pennington et al., "GloVe: Global Vectors for Word Representation", Proceedings of the 2014 Conference on Empirical Methods in Natural Language Processing (EMNLP), Oct. 25-29, 2014, pp. 1532-1543.

Peters et al., "Deep Contextualized Word Representations", Allen Institute for Artificial Intelligence, Paul G. Allen School of Computer Science & Engineering, University of Washington, Mar. 22, 2018, 15 pages.

Rajpurkar et al., "Know What You Don't Know: Unanswerable Questions for SQuAD", arXiv:1806.03822, Available Online at: https://arxiv.org/pdf/1806.03822.pdf, Jun. 11, 2018, 9 pages.

Ritter et al., "Data-Driven Response Generation in Social Media", Proceedings of the 2011 Conference on Empirical Methods in Natural Language Processing, Jul. 27-31, 2011, pp. 583-593.

Ruder, "An Overview of Gradient Descent Optimization Algorithms", Available Online at: https://arxiv.org/pdf/1609.04747.pdf, Jun. 15, 2017, 14 pages.

Schlosser, "Can Including Pros and Cons Increase the Helpfulness and Persuasiveness of Online Reviews? The Interactive Effects of Ratings and Arguments", Journal of Consumer Psychology, vol. 21, No. 3, Jul. 2011, pp. 226-239.

Schnabel et al., "Evaluation Methods for Unsupervised Word Embeddings", Proceedings of the 2015 Conference on Empirical Methods in Natural Language Processing, Available Online at: https://www.aclweb.org/anthology/D15-1036.pdf, Sep. 17-21, 2015, pp. 298-307.

Schulz et al., "A Frame Tracking Model for Memory-Enhanced Dialogue Systems", Available Online at: https://arxiv.org/pdf/1706.01690.pdf, Jun. 6, 2017, 9 pages.

(56) References Cited

OTHER PUBLICATIONS

Sidorov et al., "Syntactic N-Grams as Machine Learning Features for Natural Language Processing", Expert Systems with Applications, vol. 41, Issue 3, Feb. 15, 2014, pp. 853-860.
Sun et al., "Conversational Recommender System", Available Online at https://arxiv.org/pdf/1806.03277.pdf, Jun. 8, 2018, 10 pages.
Thompson et al., "A Personalized System for Conversational Recommendations", Journal of Artificial Intelligence Research, vol. 21, No. 1, Mar. 2004, pp. 393-428.
Tseng et al., "Tree-Structured Semantic Encoder with Knowledge Sharing for Domain Adaptation in Natural Language Generation", Available Online at: https://arxiv.org/pdf/1910.06719.pdf, Oct. 2, 2019, 10 pages.
Zhao et al., "Application-Driven Statistical Paraphrase Generation", Proceedings of the 47th Annual Meeting of the ACL and the 4th IJCNLP of the AFNLP, Aug. 2-7, 2009, pp. 834-842.
Hou Y(2019) Task Oriented Dialogue Dataset Survey, retrieved at https://github.com/AtmaHou/Task-Oriented-Dialogue-Dataset-Survey.
Hoffman C (2019) Financial Report Ontology, retrieved at http://www.xbrlsite.com/2015/fro/.
Facebook Babi (2019), retrieved at https://research.fb.com/downloads/babi/.
ExplosionAI (2019) Sense2vec: Semantic Analysis of the Reddit Hivemind, retrieved at https://explosion.ai/demos/sense2vec.
TurkuNLP (2019), retrieved at http://bionlp-www.utu.fi/wv_demo/.
Turbomaze (2019), retrieved at http://turbomaze.github.io/word2vecjson/.
Bazińska (2017), Explore word analogies, retrieved at https://lamyiowce.github.io/word2viz/.
Frase (2019) Frase HubSpot Assistant, retrieved at https://www.frase.io/?hubspot.
Selivanov D (2018) GloVe Word Embeddings, retrieved at https://cran.r-project.org/web/packages/text2vec/vignettes/glove.html.
Colin Shaw (2015) 3 Reasons Why People Say One Thing and Do Another, retrieved at https://beyondphilosophy.com/3-reasons-why-people-say-one-thing-and-do-another/.
Lucas C., et al, (2015). "Computer-Assisted Text Analysis for Comparative Politics", Political Analysis, 23:254-277.
Alicke MD, Ellen Gordon, David Rose (2012) Hypocrisy: What counts? Philosophical Psychology 26(5), 31 pages.
Barden J, Derek D. Rucker, Richard E. Petty (2005) Saying One Thing and Doing Another: Examining the Impact of Event Order on Hypocrisy Judgments of Others. Personality and Social Psychology, 31:11, pp. 1463-1474.
U.S. Appl. No. 16/902,015, Final Office Action dated Jun. 9, 2022, 13 pages.
U.S. Appl. No. 16/408,224, Supplemental Notice of Allowability dated Apr. 7, 2022, 4 pages.
Indian Application No. 202047007045, First Examination Report dated Mar. 25, 2022, 6 pages.
European Patent Application No. 18789298.9, Office Action dated Jan. 18, 2022, 8 pages.
Bird, et al., Natural Language Processing with Python—Analyzing Text with the Natural Language Toolkit, Natural Language Processing with Python—Analyzing Text with the Natural Language Toolkit, Jan. 1, 2009 (Jan. 1, 2009), O'Reilly Media.
Maziero et al., Revisiting Cross-Document Structure Theory for Multi-Document Discourse Parsing, Information Processing & Management, vol. 50, No. 2, Mar. 2014, pp. 297-314.
Radev, A Common Theory of Information Fusion from Multiple Text Sources Step One: Cross-document Structure, Proceedings of the 1st SIGDial Workshop on Discourse and Dialogue, vol. 10, Oct. 7-8, 2000, pp. 74-83.

\* cited by examiner

DETECTING HYPOCRISY IN TEXT

CROSS-REFERENCES TO RELATED APPLICATIONS

This application claims the benefit of U.S. Provisional Application No. 62/935,328 filed Nov. 14, 2019, the contents of which are incorporated herein for all purposes.

TECHNICAL FIELD

This disclosure is generally concerned with linguistics. More specifically, this disclosure relates to improved autonomous agents that use communicative discourse trees and sentiment detection to identify hypocrisy in text.

BACKGROUND

Computer-implemented applications of linguistics are increasing due to the greatly increased speed of processors and capacity of memory. For example, computer-based analysis of language discourse facilitates numerous applications, such as automated agents that can answer questions received from user devices. But such solutions are unable to completely analyze textual inputs. Hence, new solutions are needed.

BRIEF SUMMARY

Techniques are disclosed for identifying hypocrisy in text. An example method creates, from fragments of text, a syntactic tree that represents syntactic relationships between words in the fragments. The method identifies, in the syntactic tree, a first entity and a second entity. The method further determines that the first entity is opposite to the second entity. The method further determines a first sentiment score for a first fragment comprising the first entity and a second sentiment score for a second fragment comprising the second entity. The method, responsive to determining that the first sentiment score and the second sentiment score indicate opposite emotions, identifies the text as comprising hypocrisy and providing the text to an external device.

In an aspect, determining that the first entity is opposite to the second entity includes accessing an ontology that includes entries, wherein each entry of the entries includes a noun and one or more synonyms of the noun and responsive to identifying, in the ontology, a particular entry that includes a synonym matching the first entity, substituting the noun of the particular entry as the first entity.

In an aspect, the method includes providing the respective entity to a search engine; receiving, from the search engine, an additional entity that is a synonym of the entity; and adding the additional entity to a synonym in the respective entry.

In an aspect, determining that the first entity is opposite to the second entity includes providing the syntactic tree, the first entity, and the second entity to a classification model; and receiving, from the classification model, an indication that the first entity is opposite to the second entity.

In an aspect, determining the sentiment score for each fragment includes identifying keywords from the fragment. Determining the sentiment score further includes determining a keyword sentiment score for each keyword of the keywords. The keyword sentiment score indicates whether the keyword signifies positive or negative sentiment. Determining the sentiment score further includes determining an average keyword sentiment score of the keywords. Determining the sentiment score further includes identifying the average keyword sentiment score as the sentiment score.

Determining the sentiment score for each fragment includes creating a communicative discourse tree from the respective fragment. Determining the sentiment score further includes providing the communicative discourse tree to a machine-learning model. The machine-learning model being trained to identify emotions based on input communicative discourse trees for which emotion associations are known. Determining the sentiment score further includes receiving the sentiment score from the machine-learning model.

In an aspect, the method includes providing one or more of the first entity and the second entity to the external device.

In another aspect, a method includes accessing text including fragments. The method includes creating, from the fragments, a syntactic tree that represents syntactic relationships between words in the fragments. The method further includes creating, from the fragments, a discourse tree that represents rhetorical relationships between words in the fragments. The method further includes providing the syntactic tree and the discourse tree to a nearest neighbor classification model. The method further includes receiving, from nearest neighbor classification model, a score indicating a presence of hypocrisy in the text. The method further includes responsive to determining that the score is greater than a threshold, identifying the text as including hypocrisy.

In another aspect, the method further includes accessing a set of training data including labels and text, wherein the labels indicate text associated with hypocrisy and text that is not associated with hypocrisy; and iteratively training the nearest neighbor classification model using a support vector machine model and the set of training data.

In another aspect, the method further includes receiving, from a user device, an correction indicating that the identification that the text includes hypocrisy is incorrect. The method includes updating the nearest neighbor classification model with the correction. The method includes adding the syntactic tree and the correction to a training data set.

In an aspect, the syntactic tree includes a first entity and a second entity and the classification model identifies a relationship between the first entity and the second entity.

In another aspect, the method further includes providing one or more of the first entity and the second entity to the external device.

The exemplary methods discussed above can be implemented on systems including one or more processors or stored as instructions on a non-transitory computer-readable medium.

DETAILED DESCRIPTION

Figure 1:
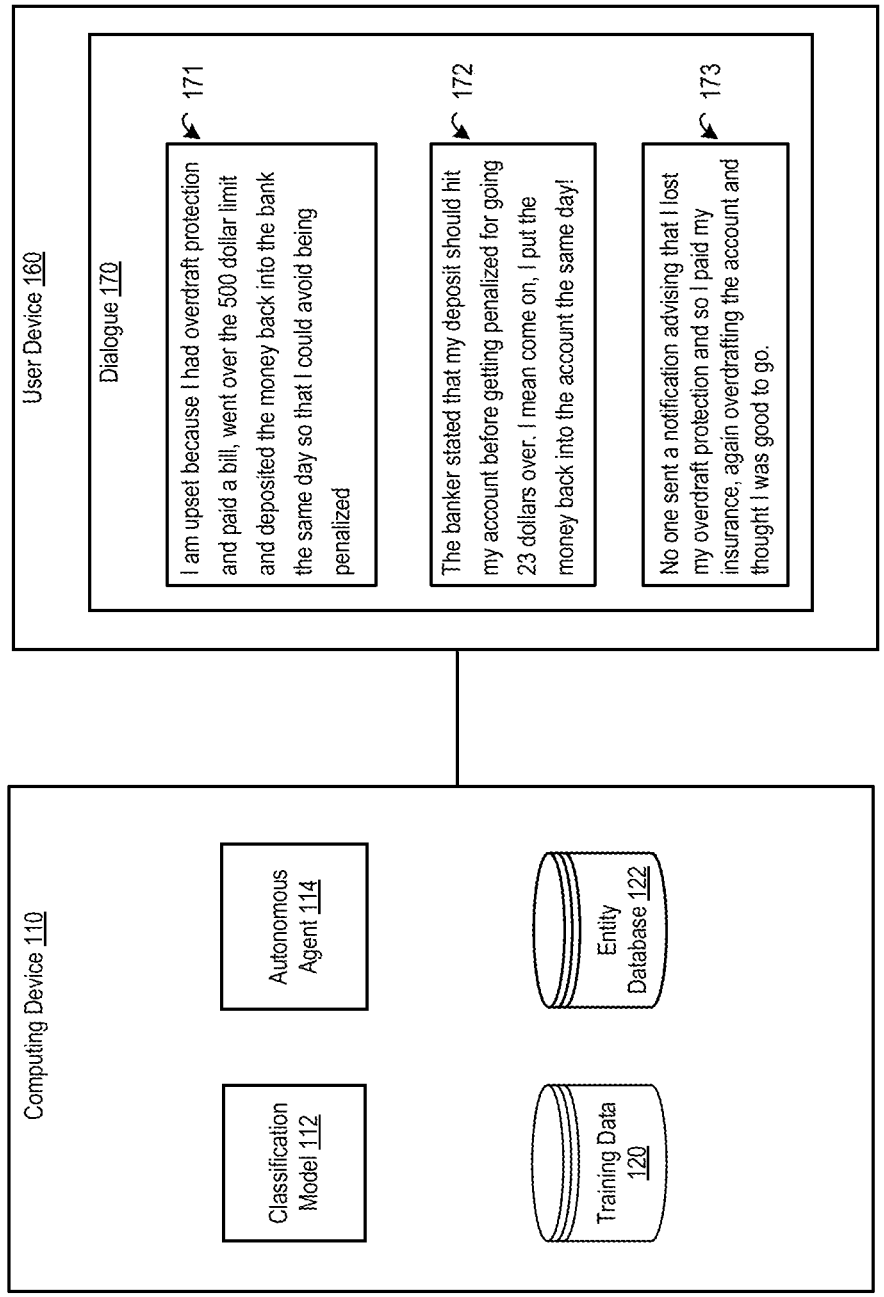
FIG. 1 shows an exemplary hypocrisy detection environment, in accordance with an aspect.

Aspects of the present disclosure relate to detecting hypocrisy in text. In an example, an autonomous agent analyzes utterances received from a user device. The agent identifies, by using techniques such as entity identification, sentiment detection, or machine learning, a presence of hypocrisy. The autonomous agent can take one or more actions such as changing a topic of conversation with a user device or notifying an external system of the detected hypocrisy.

Disclosed techniques therefore provide technical improvements to the area of computer-implemented linguistics. Some aspects represent text as communicative discourse trees ("CDTs"). CDTs are discourse trees that are supplemented with one or more communicative actions. A communicative action is a cooperative action undertaken by individuals based on mutual deliberation and argumentation. For instance, CDTs can be used to determine sentiment or emotion in text (e.g., user utterances). In another example, a trained machine learning model determines entities from the text. Using these techniques, improved performance over traditional statistical-based approaches can be accomplished.

Certain Definitions

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, "communicative verb" is a verb that indicates communication. For example, the verb "deny" is a communicative verb.

As used herein, "communicative action" describes an action performed by one or more agents and the subjects of the agents.

Turning now to the Figures, FIG. 1 shows an exemplary hypocrisy detection environment, in accordance with an aspect. Hypocrisy detection environment 100 includes computing device 110 and user device 160. In the example depicted in FIG. 1, computing device 101 implements an autonomous agent that engages in a conversation with user device 160 and is configured to detect a presence of hypocrisy in text. Computing device 101 uses techniques such as communicative discourse trees, entity detection, and machine learning.

Computing device 110 includes one or more of classification model 112, autonomous agent 114, training data 120, and entity database 122. Examples of computing device 101 are distributed system 1900 and client computing devices 2202, 2204, 2206, and 2208.

In some cases, autonomous agent 114 can use machine learning techniques. For example, classification model 112 can be trained to detect a presence of particular features (e.g., sentiment or hypocrisy) within one or more utterances or within a communicative discourse tree generated from the utterances. Examples of classification models include support vector machines, nearest neighbor models, and tree kernel models. Classification model 112 can be trained using and/or training data 120, which can be generated by autonomous agent 114 or another application or device.

In some cases, the entities are matched using an ontology, for instance entity database 122. Entity database 122 can be domain-specific (e.g., finance, law, business, science, etc.). The entity database 122, among other features, can provide synonym matching. Autonomous agent 114 can build entity database 112 or obtain entity database 122 from an external source.

User device 160 can be any mobile device such as a mobile phone, smart phone, tablet, laptop, smart watch, and the like. Examples of user device 160 include client computing devices 2502, 2504, 2506, and 2508. As depicted, user device 160 includes dialogue 170, which includes utterances 171-173.

Examples of suitable text include electronic text source such as text files, Portable Document Format (PDF)® documents, rich text documents, and the like. In some cases, preprocessing may be performed on the input text to remove unwanted characters or formatting fields. Input text can be organized by using one or more structural or organizational approaches such as sections, paragraphs, pages, and the like.

In an example, autonomous agent 114 can interact with user device 160, for example, in a dialogue session. Autonomous agent 114 accesses text, for example from dialogue 170 (which includes utterances 171-173). Autonomous agent 114 creates a syntactic tree from the utterances. From the syntactic tree, autonomous agent 114 identifies entities. Examples of entities are people, places, or things. Autonomous agent 114 identifies sentiment for each of the identified entities. In particular, autonomous agent 114 determines a first sentiment score for a first fragment of text that includes the first entity and a second sentiment score for a second fragment of text that includes the second entity. When the first and second sentiment scores indicate opposite emotions, the autonomous agent 114 identifies the text as including hypocrisy. An example of a method for detecting hypocrisy is discussed with respect to FIG. 19.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use communicative discourse trees. Rhetorical relations can be described in different ways. For example, Mann and Thompson describe twenty-three possible relations. C. Mann, William & Thompson, Sandra. (1987) ("Mann and Thompson"). Rhetorical Structure Theory: A Theory of Text Organization. Other numbers of relations are possible.

| Relation Name | Nucleus | Satellite |
| --- | --- | --- |
| Antithesis | ideas favored by the author | ideas disfavored by the author |
| Background | text whose understanding is being facilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |

-continued

| Relation Name | Nucleus | Satellite |
| --- | --- | --- |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown below.

| Relation Name | Span | Other Span |
| --- | --- | --- |
| Contrast | One alternate (unconstrained) | The other alternate (unconstrained) |
| Joint | | |
| List | An item | A next item |
| Sequence | An item | A next item |

Figure 2:
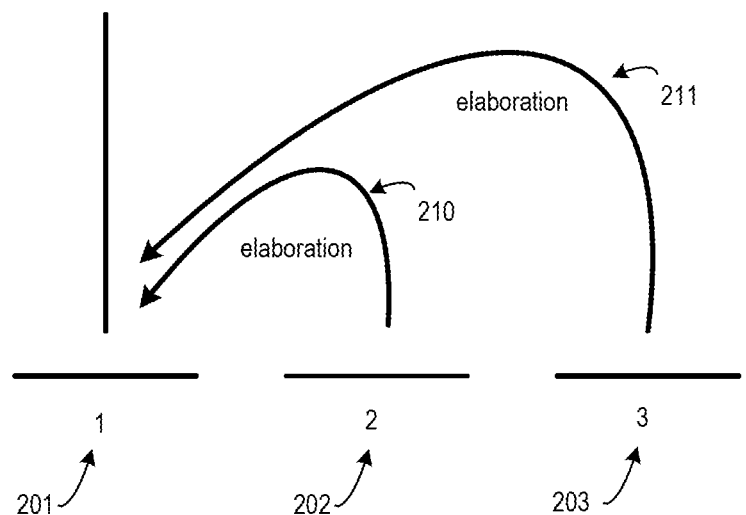
FIG. 2 depicts an example of a discourse tree in accordance with an aspect.
Figure 3:
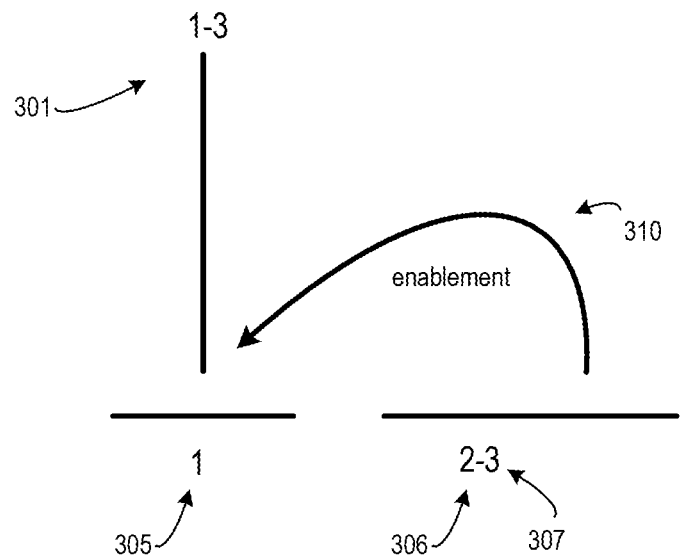
FIG. 3 depicts a further example of a discourse tree in accordance with an aspect.
Figure 3:
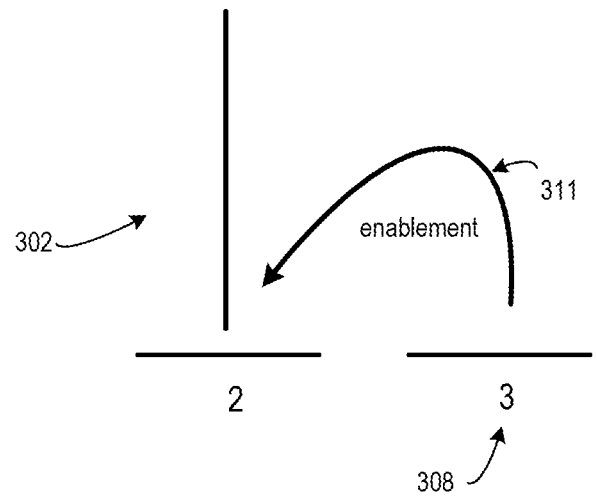

FIG. 2 depicts an example of a discourse tree, in accordance with an aspect. FIG. 2 includes discourse tree 190. Discourse tree includes text span 191, text span 192, text span 193, relation 210 and relation 228. The numbers in FIG. 2 correspond to the three text spans. FIG. 3 corresponds to the following example text with three text spans numbered 1, 2, 3:

1. Honolulu, Hi. will be site of the 1917 Conference on Hawaiian History

2. It is expected that 190 historians from the U.S. and Asia will attend

3. The conference will be concerned with how the Polynesians sailed to Hawaii

For example, relation 210, or elaboration, describes the relationship between text span 191 and text span 192. Relation 228 depicts the relationship, elaboration, between text span 193 and 194. As depicted, text spans 192 and 193 elaborate further on text span 191. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 301 and 302, text spans 305-307, relation 310 and relation 328. Relation 310 depicts the relation 310, enablement, between components 306 and 305, and 307, and 305. FIG. 3 refers to the following text spans:

1. The new Tech Report abstracts are now in the journal area of the library near the abridged dictionary.

2. Please sign your name by any means that you would be interested in seeing.

3. Last day for sign-ups is 31 May.

As can be seen, relation 328 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:

(1) Divide the discourse text into units by:
  (a) Unit size may vary, depending on the goals of the analysis
  (b) Typically, units are clauses (2) Examine each unit, and its neighbors. Is there a relation holding between them?

(3) If yes, then mark that relation.

(4) If not, the unit might be at the boundary of a higher-level relation. Look at relations holding between larger units (spans).

(5) Continue until all the units in the text are accounted for.

Figure 4:
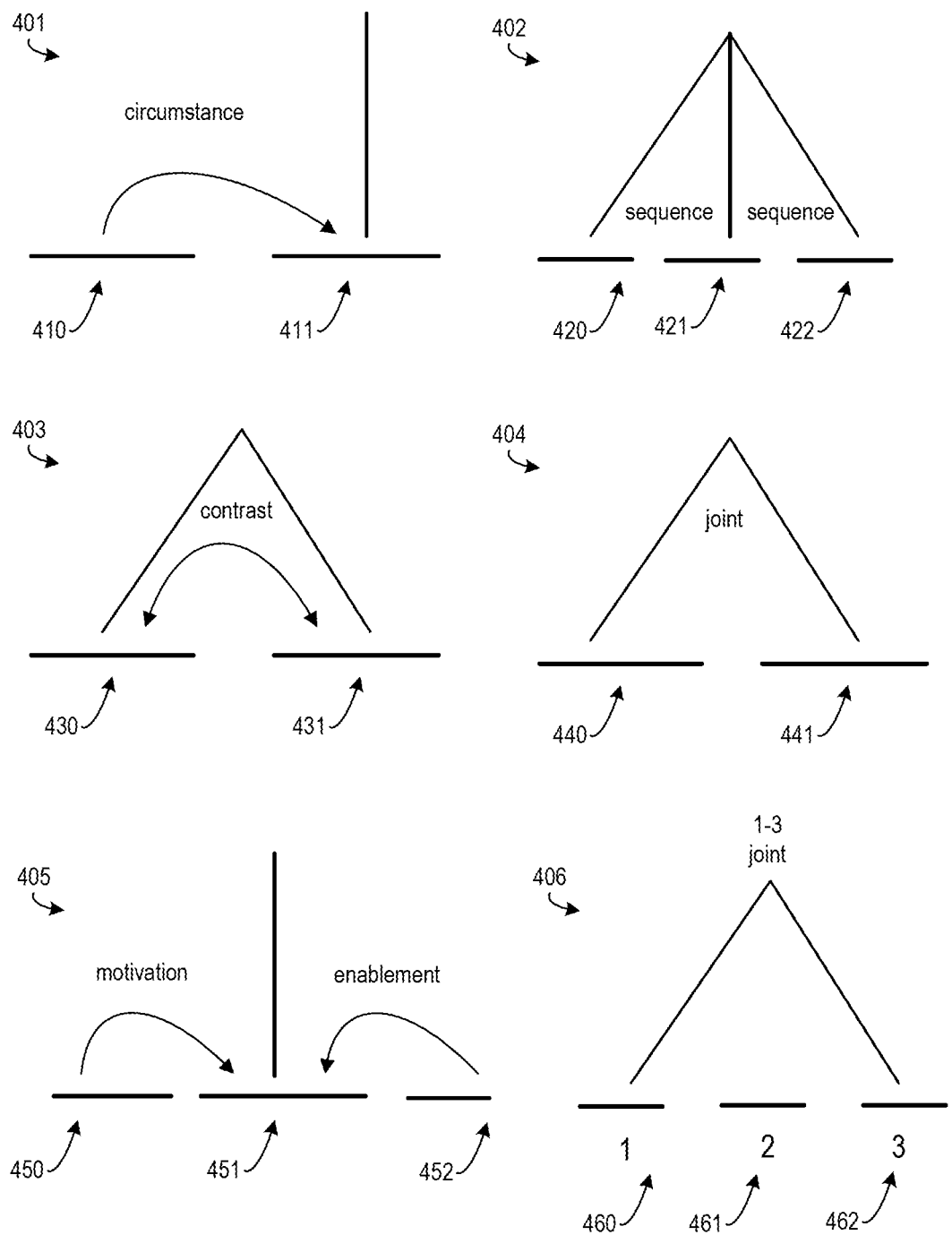
FIG. 4 depicts illustrative schemas, in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas, in accordance with an aspect. FIG. 4 shows a joint schema is a list of items consisting of nuclei with no satellites. FIG. 4 depicts schemas 401-406. Schema 401 depicts a circumstance relation between text spans 410 and 428. Scheme 402 depicts a sequence relation between text spans 419 and 421 and a sequence relation between text spans 421 and 422. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:

1. Skies will be partly sunny in the New York metropolitan area today.
2. It will be more humid, with temperatures in the middle 80's.
3. Tonight will be mostly cloudy, with the low temperature between 65 and 70.

While FIGS. 2-4 depict some graphical representations of a discourse tree, other representations are possible.

Figure 5:
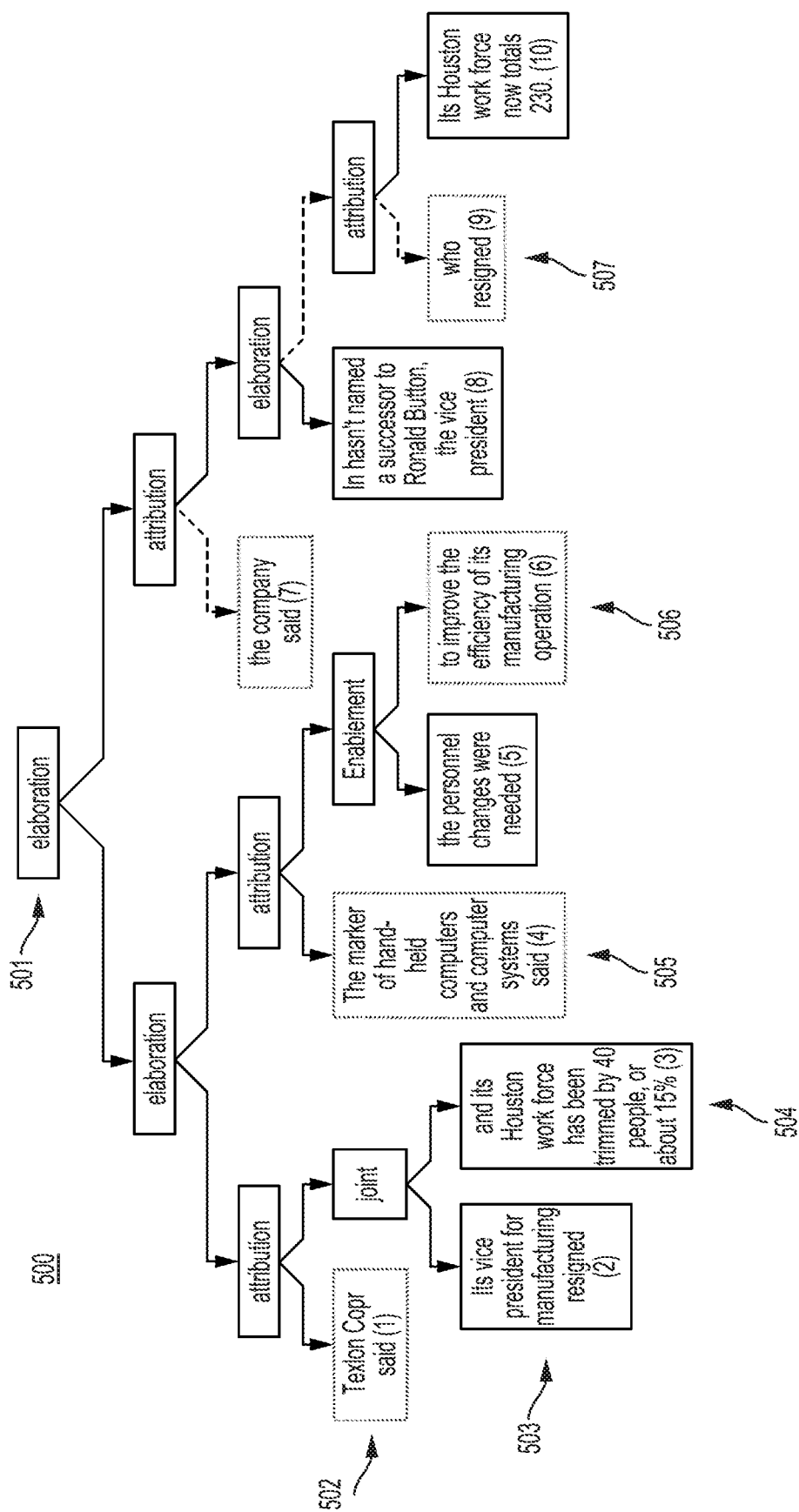
FIG. 5 depicts a node-link representation of the hierarchical binary tree in accordance with an aspect.

FIG. 5 depicts a node-link representation of the hierarchical binary tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two sub-tasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 1913. Combining intra- and multi-sentential rhetorical parsing for document-level discourse analysis. In ACL (1), pages 486-496.

Figure 6:
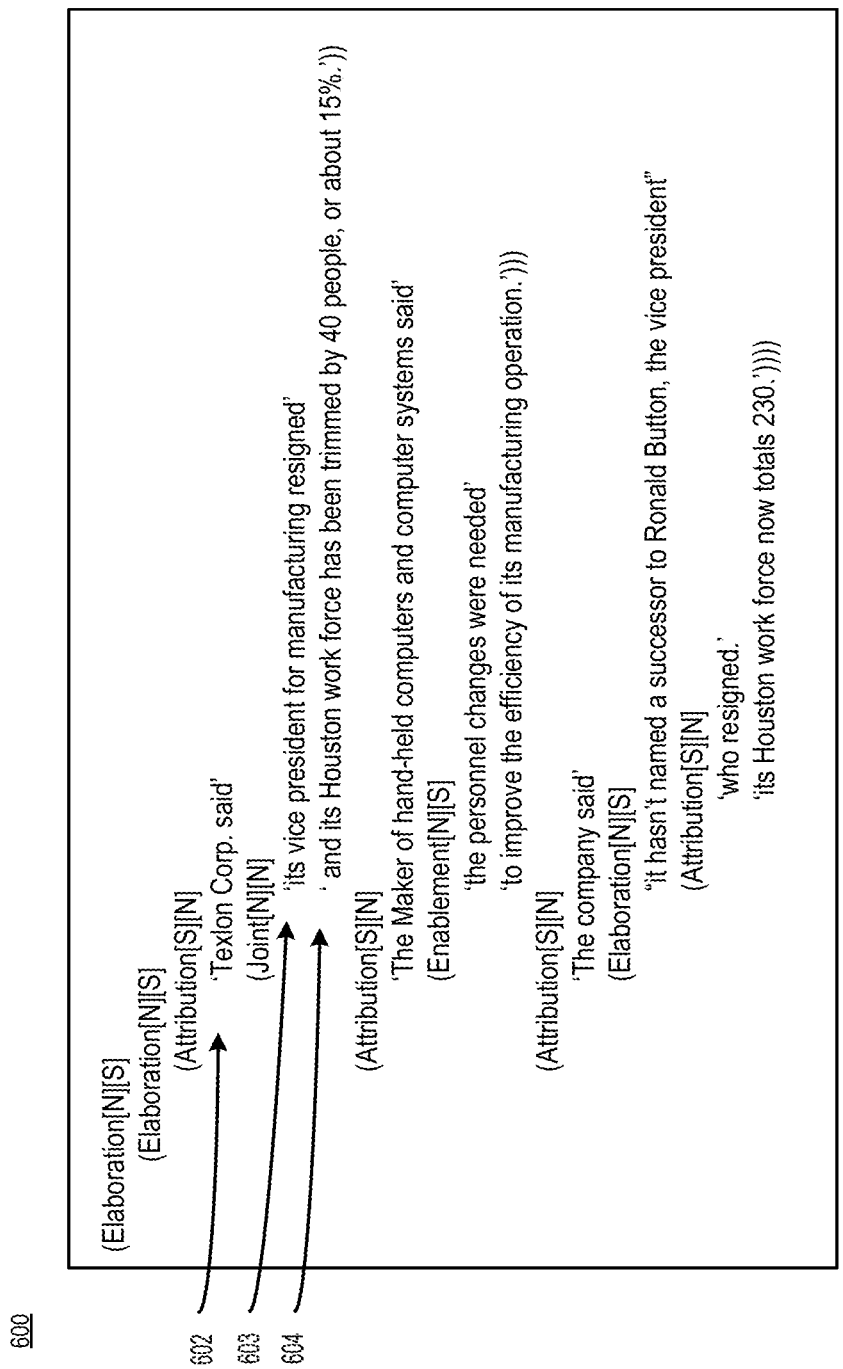
FIG. 6 depicts an exemplary indented text encoding of the representation in FIG. 5 in accordance with an aspect.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (1915).

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (1900). Precision, or positive predictive value is the fraction of relevant instances among the retrieved instances, while recall (also known as sensitivity) is the fraction of relevant instances that have been retrieved over the total amount of relevant instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is 5/8 while its recall is 5/12. When a search engine returns 30 pages only 19 of which were relevant while failing to return 40 additional relevant pages, its precision is 19/30=2/3 while its recall is 19/60=1/3. Therefore, in this case, precision is 'how useful the search results are', and recall is 'how complete the results are.'" The F1 score (also F-score or F-measure) is a measure of a test's accuracy. It considers both the precision and the recall of the test to compute the score: F1=2× ((precision×recall)/(precision+recall)) and is the harmonic mean of precision and recall. The F1 score reaches its best value at 1 (perfect precision and recall) and worst at 0.

Autonomous Agents or Chatbots

A conversation between Human A and Human B is a form of discourse. For example, applications exist such as FaceBook® Messenger, WhatsApp®, Slack,® SMS, etc., a conversation between A and B may typically be via messages in addition to more traditional email and voice conversations. A chatbot (which may also be called intelligent bots or virtual assistant, etc.) is an "intelligent" machine that, for example, replaces human B and to various degrees mimics the conversation between two humans. An example ultimate goal is that human A cannot tell whether B is a human or a machine (the Turning test, developed by Alan Turing in 1950). Discourse analysis, artificial intelligence, including machine learning, and natural language processing, have made great strides toward the long-term goal of passing the Turing test. Of course, with computers being more and more capable of searching and processing vast repositories of data and performing complex analysis on the data to include predictive analysis, the long-term goal is the chatbot being human-like and a computer combined.

For example, users can interact with the Intelligent Bots Platform through a conversational interaction. This interaction, also called the conversational user interface (UI), is a dialog between the end user and the chatbot, just as between two human beings. It could be as simple as the end user saying "Hello" to the chatbot and the chatbot responding with a "Hi" and asking the user how it can help, or it could be a transactional interaction in a banking chatbot, such as transferring money from one account to the other, or an informational interaction in a HR chatbot, such as checking for vacation balance, or asking an FAQ in a retail chatbot, such as how to handle returns. Natural language processing (NLP) and machine learning (ML) algorithms combined with other approaches can be used to classify end user intent. An intent at a high level is what the end user would like to accomplish (e.g., get account balance, make a purchase). An intent is essentially, a mapping of customer input to a unit of work that the backend should perform. Therefore, based on the phrases uttered by the user in the chatbot, these are mapped that to a specific and discrete use case or unit of work, for e.g. check balance, transfer money and track spending are all "use cases" that the chatbot should support and be able to work out which unit of work should be triggered from the free text entry that the end user types in a natural language.

The underlying rational for having an AI chatbot respond like a human is that the human brain can formulate and understand the request and then give a good response to the human request much better than a machine. Thus, there should be significant improvement in the request/response of a chatbot, if human B is mimicked. So an initial part of the problem is how does the human brain formulate and understand the request? To mimic, a model is used. RST and DT allow a formal and repeatable way of doing this.

At a high level, there are typically two types of requests: (1) A request to perform some action; and (2) a request for information, e.g., a question. The first type has a response in which a unit of work is created. The second type has a response that is, e.g., a good answer, to the question. The answer could take the form of, for example, in some aspects, the AI constructing an answer from its extensive knowledge base(s) or from matching the best existing answer from searching the internet or intranet or other publically/privately available data sources.

Communicative Discourse Trees and the Rhetoric Classifier

Aspects of the present disclosure build communicative discourse trees and use communicative discourse trees to analyze whether the rhetorical structure of a request or question agrees with an answer. More specifically, aspects described herein create representations of a request-response pair, learns the representations, and relates the pairs into classes of valid or invalid pairs. In this manner, an autonomous agent can receive a question from a user, process the question, for example, by searching for multiple answers, determine the best answer from the answers, and provide the answer to the user.

More specifically, to represent linguistic features of text, aspects described herein use rhetoric relations and speech acts (or communicative actions). Rhetoric relations are relationships between the parts of the sentences, typically obtained from a discourse tree. Speech acts are obtained as verbs from a verb resource such as VerbNet. By using both rhetoric relations and communicative actions, aspects described herein can correctly recognize valid request-response pairs. To do so, aspects correlate the syntactic structure of a question with that of an answer. By using the structure, a better answer can be determined.

For example, when an autonomous agent receives an indication from a person that the person desires to sell an item with certain features, the autonomous agent should provide a search result that not only contains the features but also indicates an intent to buy. In this manner, the autonomous agent has determined the user's intent. Similarly, when an autonomous agent receives a request from a person to share knowledge about a particular item, the search result should contain an intent to receive a recommendation. When a person asks an autonomous agent for an opinion about a subject, the autonomous agent shares an opinion about the subject, rather than soliciting another opinion.

Analyzing Request and Response Pairs

Figure 7:
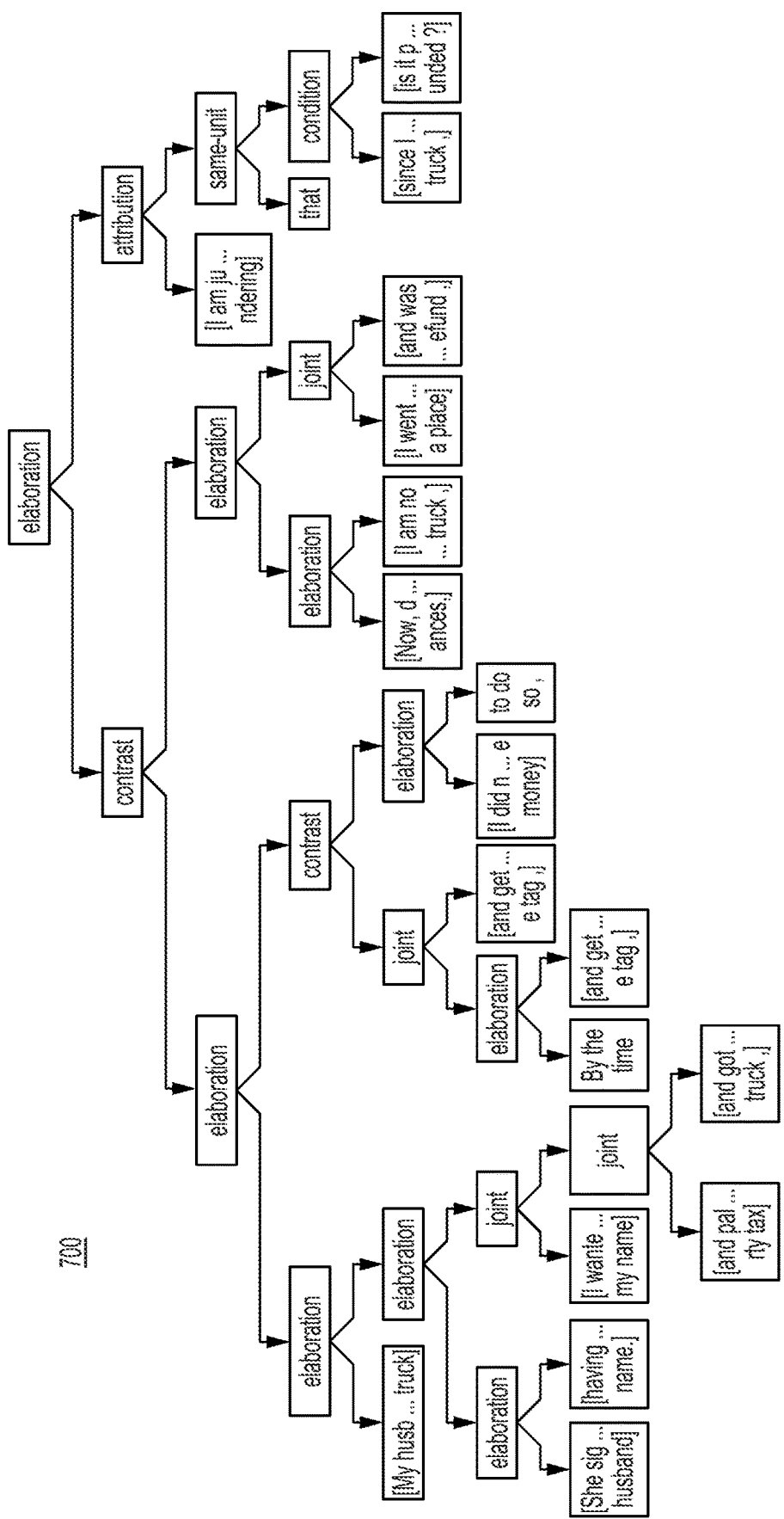
FIG. 7 depicts an exemplary DT for an example request about property tax in accordance with an aspect.

FIG. 7 depicts an exemplary DT for an example request about property tax in accordance with an aspect. The node labels are the relations and the arrowed line points to the satellite. The nucleus is a solid line. FIG. 7 depicts the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck."

is elaborated by;

"I didn't have the money" elaborated by "to do so" contrasted with

"By the time" elaborated by "it came to sending off the title"

"and getting the tag"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place"

"and was refused a refund"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to

"that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the incon- sistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
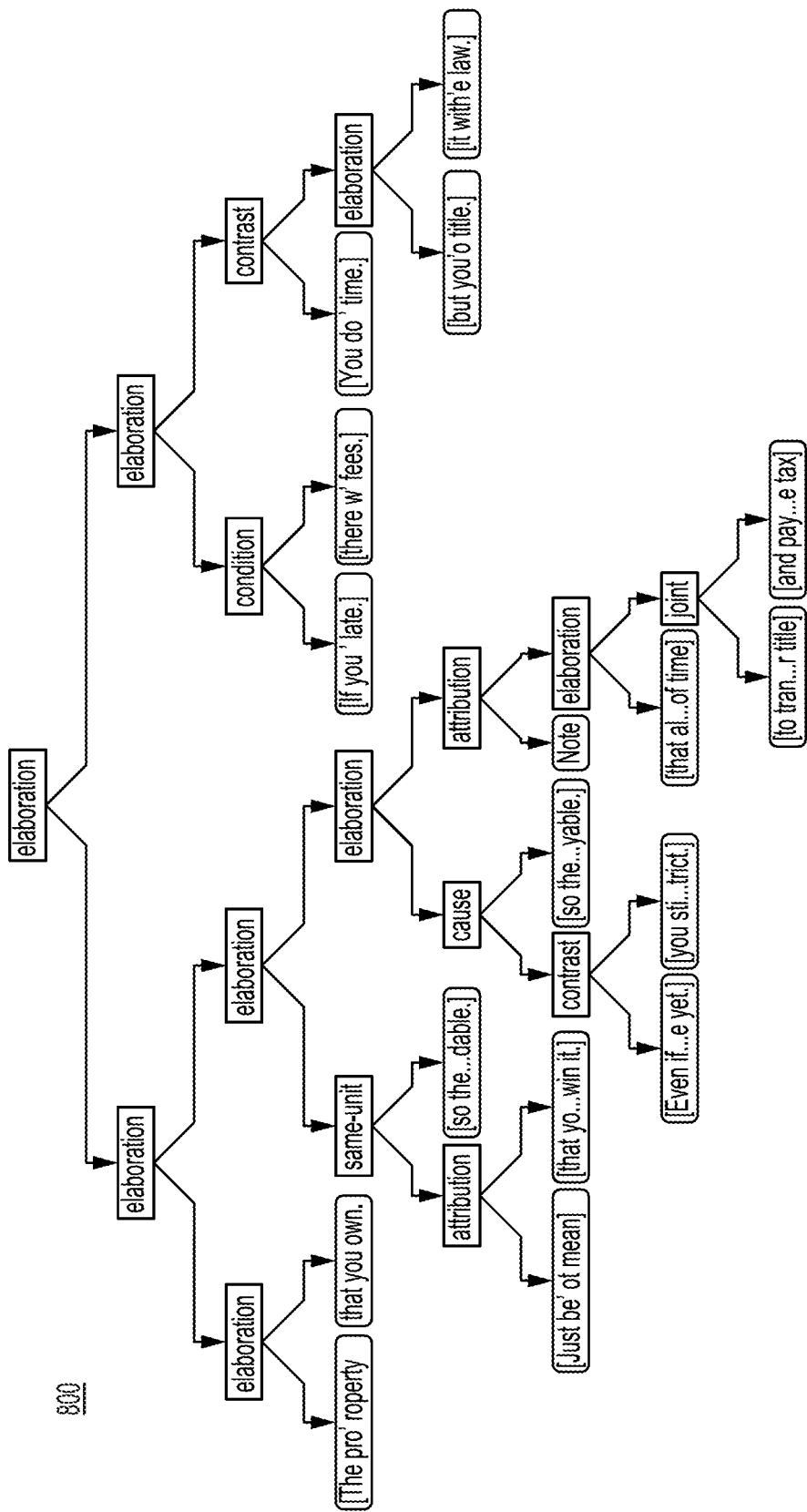
FIG. 8 depicts an exemplary response for the question represented in FIG. 7.

FIG. 8 depicts an exemplary response for the question represented in FIG. 7, according to certain aspects of the present invention. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
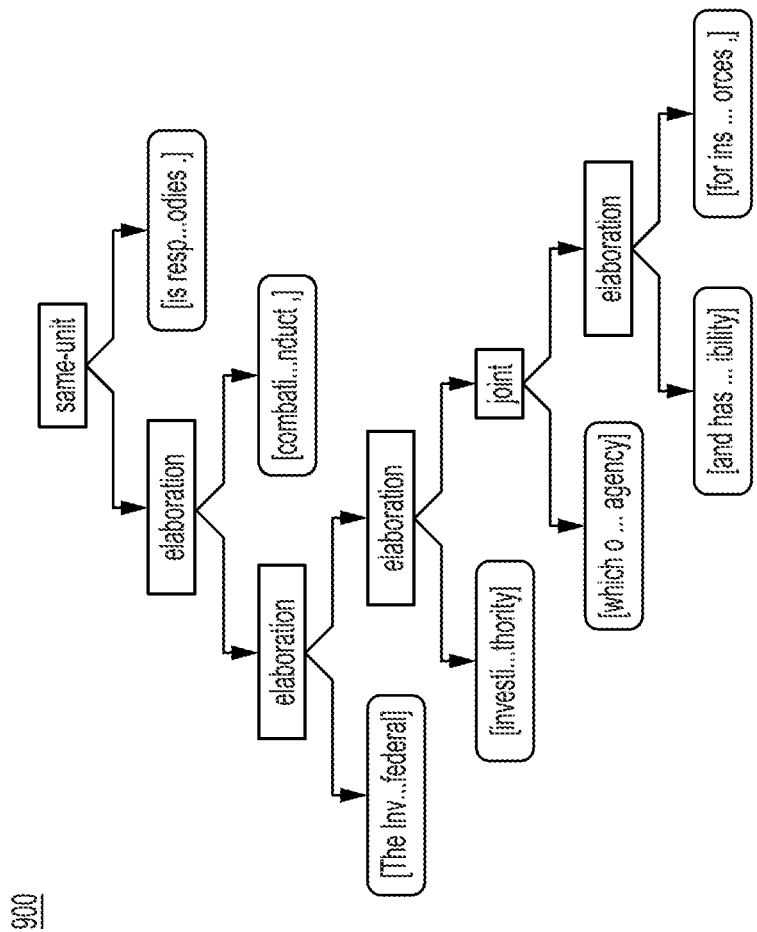
FIG. 9 illustrates a discourse tree for an official answer in accordance with an aspect.

FIG. 9 illustrates a discourse tree for an official answer in accordance with an aspect. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
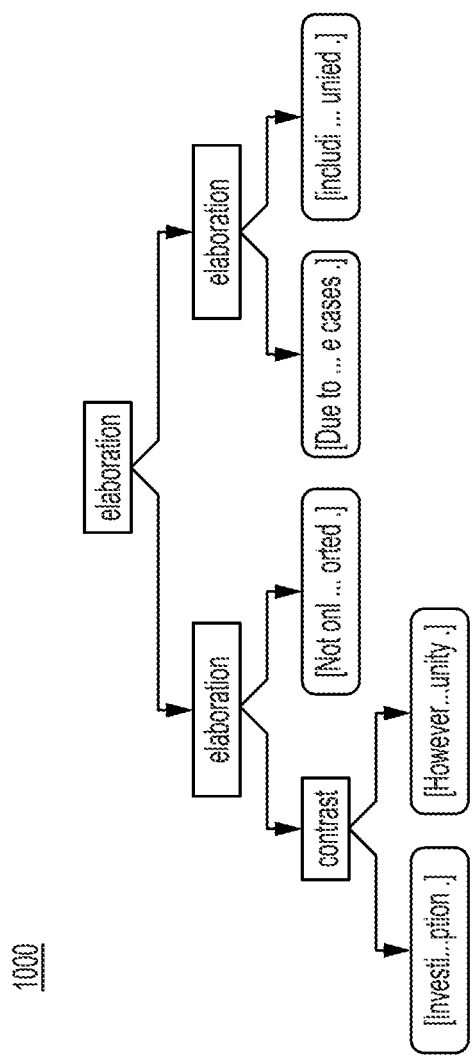
FIG. 10 illustrates a discourse tree for a raw answer in accordance with an aspect.

FIG. 10 illustrates a discourse tree for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers. (See FIG. 9 and FIG. 10). Sometimes, the question itself can give a hint about which category of answers is expected. If a question is formulated as a factoid or definitional one, without a second meaning, then the first category of answers is suitable. Otherwise, if a question has the meaning "tell me what it really is", then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Classification of Request-Response Pairs

Autonomous agent 114 can determine whether a given answer or response, such as an answer obtained from answer database 105 or a public database, is responsive to a given question, or request. More specifically, autonomous agent 114 analyzes whether a request and response pair is correct or incorrect by determining one or both of (i) relevance or (ii) rhetoric agreement between the request and the response. Rhetoric agreement can be analyzed without taking into account relevance, which can be treated orthogonally.

Autonomous agent 114 can determine similarity between question-answer pairs using different methods. For example, autonomous agent 114 can determine level of similarity between an individual question and an individual answer. Alternatively, autonomous agent 114 can determine a measure of similarity between a first pair including a question and an answer, and a second pair including a question and answer.

For example, autonomous agent 114 uses rhetoric agreement classifier 119 trained to predict matching or nonmatching answers. Autonomous agent 114 can process two pairs at a time, for example <q1, a1> and <q2, a2>. Autonomous agent 114 compares q1 with q2 and a1 with a1, producing a combined similarity score. Such a comparison allows a determination of whether an unknown question/answer pair contains a correct answer or not by assessing a distance from another question/answer pair with a known label. In particular, an unlabeled pair <q2, a2> can be processed so that rather than "guessing" correctness based on words or structures shared by q2 and a2, both q2 and a2 can be compared with their corresponding components q1 and a2 of the labeled pair <q2, a2> on the grounds of such words or structures. Because this approach targets a domain-independent classification of an answer, only the structural cohesiveness between a question and answer can be leveraged, not 'meanings' of answers.

In an aspect, autonomous agent 114 uses training data 125 to train rhetoric agreement classifier 119. In this manner, rhetoric agreement classifier 119 is trained to determine a similarity between pairs of questions and answers. This is a classification problem. Training data 125 can include a positive training set and a negative training set. Training data 125 includes matching request-response pairs in a positive dataset and arbitrary or lower relevance or appropriateness request-response pairs in a negative dataset. For the positive dataset, various domains with distinct acceptance criteria are selected that indicate whether an answer or response is suitable for the question.

Each training data set includes a set of training pairs. Each training set includes a question communicative discourse tree that represents a question and an answer communicative discourse tree that represents an answer and an expected level of complementarity between the question and answer. By using an iterative process, autonomous agent 114 provides a training pair to rhetoric agreement classifier 119 and receives, from the model, a level of complementarity. Autonomous agent 114 calculates a loss function by determining a difference between the determined level of complementarity and an expected level of complementarity for the particular training pair. Based on the loss function, autonomous agent 114 adjusts internal parameters of the classification model to minimize the loss function.

Acceptance criteria can vary by application. For example, acceptance criteria may be low for community question answering, automated question answering, automated and manual customer support systems, social network communications and writing by individuals such as consumers about their experience with products, such as reviews and complaints. RR acceptance criteria may be high in scientific texts, professional journalism, health and legal documents in the form of FAQ, professional social networks such as "stackoverflow."

Communicative Discourse Trees (CDTs)

Autonomous agent 114 can create, analyze, and compare communicative discourse trees. Communicative discourse trees are designed to combine rhetoric information with speech act structures. CDTs include with arcs labeled with expressions for communicative actions. By combining communicative actions, CDTs enable the modeling of RST relations and communicative actions. A CDT is a reduction of a parse thicket. See Galitsky, B, Ilvovsky, D. and Kuznetsov S O. Rhetoric Map of an Answer to Compound Queries Knowledge Trail Inc. ACL 1915, 681-686. ("Galitsky 1915"). A parse thicket is a combination of parse trees for sentences with discourse-level relationships between words and parts of the sentence in one graph. By incorporating labels that identify speech actions, learning of communicative discourse trees can occur over a richer features set than just rhetoric relations and syntax of elementary discourse units (EDUs).

In an example, a dispute between three parties concerning the causes of a downing of a commercial airliner, Malaysia Airlines Flight 17 is analyzed. An RST representation of the arguments being communicated is built. In the example, three conflicting agents, Dutch investigators, The Investigative Committee of the Russian Federation, and the self-proclaimed Donetsk People's Republic exchange their opinions on the matter. The example illustrates a controversial conflict where each party does all it can to blame its opponent. To sound more convincing, each party does not just produce its claim but formulates a response in a way to rebuff the claims of an opponent. To achieve this goal, each party attempts to match the style and discourse of the opponents' claims.

Figure 11:
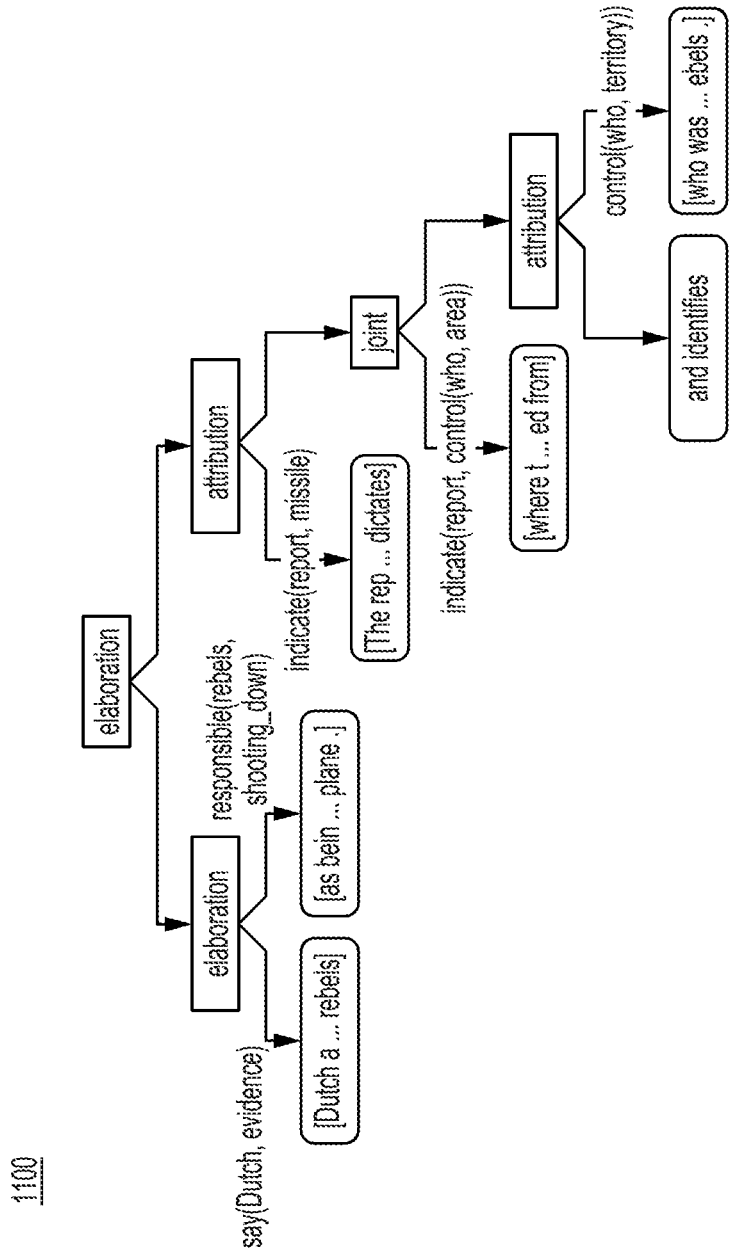
FIG. 11 illustrates a communicative discourse tree for a claim of a first agent in accordance with an aspect.

FIG. 11 illustrates a communicative discourse tree for a claim of a first agent in accordance with an aspect. FIG. 11 depicts communicative discourse tree 1100, which represents the following text: "Dutch accident investigators say that evidence points to pro-Russian rebels as being responsible for shooting down plane. The report indicates where the missile was fired from and identifies who was in control of the territory and pins the downing of MH17 on the pro-Russian rebels."

As can be seen from FIG. 11, non-terminal nodes of CDTs are rhetoric relations, and terminal nodes are elementary discourse units (phrases, sentence fragments) which are the subjects of these relations. Certain arcs of CDTs are labeled with the expressions for communicative actions, including the actor agent and the subject of these actions (what is being communicated). For example, the nucleus node for elaboration relation (on the left) are labeled with say (Dutch, evidence), and the satellite with responsible(rebels, shooting down). These labels are not intended to express that the subjects of EDUs are evidence and shooting down but instead for matching this CDT with others for the purpose of finding similarity between them. In this case just linking these communicative actions by a rhetoric relation and not providing information of communicative discourse would be too limited way to represent a structure of what and how is being communicated. A requirement for an RR pair to have the same or coordinated rhetoric relation is too weak, so an agreement of CDT labels for arcs on top of matching nodes is required.

The straight edges of this graph are syntactic relations, and curvy arcs are discourse relations, such as anaphora, same entity, sub-entity, rhetoric relation and communicative actions. This graph includes much richer information than just a combination of parse trees for individual sentences. In addition to CDTs, parse thickets can be generalized at the level of words, relations, phrases and sentences. The speech actions are logic predicates expressing the agents involved in the respective speech acts and their subjects. The arguments of logical predicates are formed in accordance to respective semantic roles, as proposed by a framework such as VerbNet. See Karin Kipper, Anna Korhonen, Neville Ryant, Martha Palmer, A Large-scale Classification of English Verbs, Language Resources and Evaluation Journal, 42(1), pp. 21-40, Springer Netherland, 1908. and/or Karin Kipper Schuler, Anna Korhonen, Susan W. Brown, VerbNet overview, extensions, mappings and apps, Tutorial, NAACL-HLT 1909, Boulder, Colo.

Figure 12:
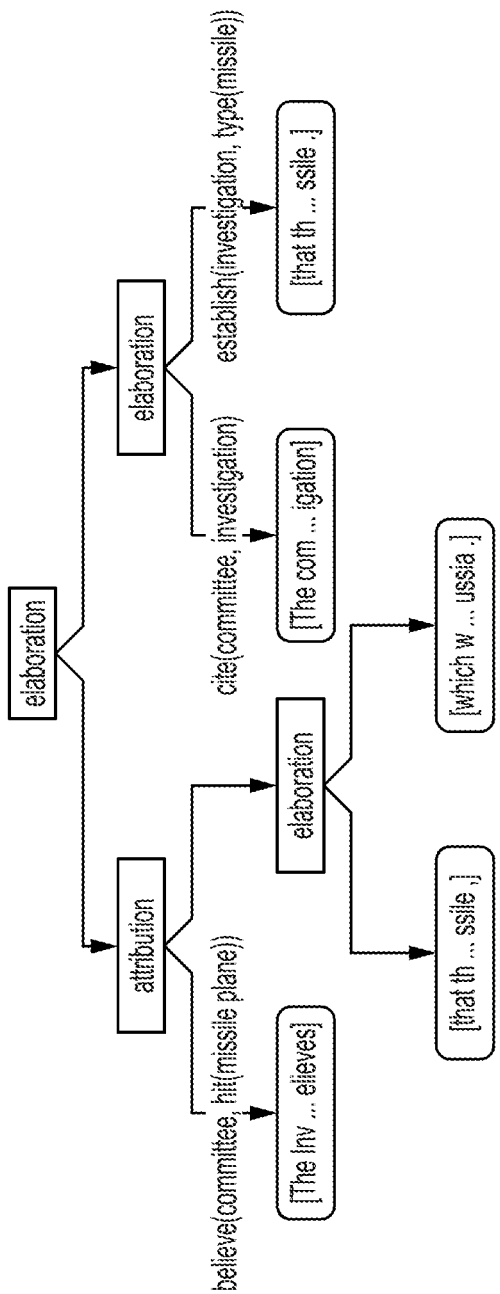
FIG. 12 illustrates a communicative discourse tree for a claim of a second agent in accordance with an aspect.

FIG. 12 illustrates a communicative discourse tree for a claim of a second agent in accordance with an aspect. FIG. 12 depicts communicative discourse tree 1190, which represents the following text: "The Investigative Committee of the Russian Federation believes that the plane was hit by a missile, which was not produced in Russia. The committee cites an investigation that established the type of the missile."

Figure 13:
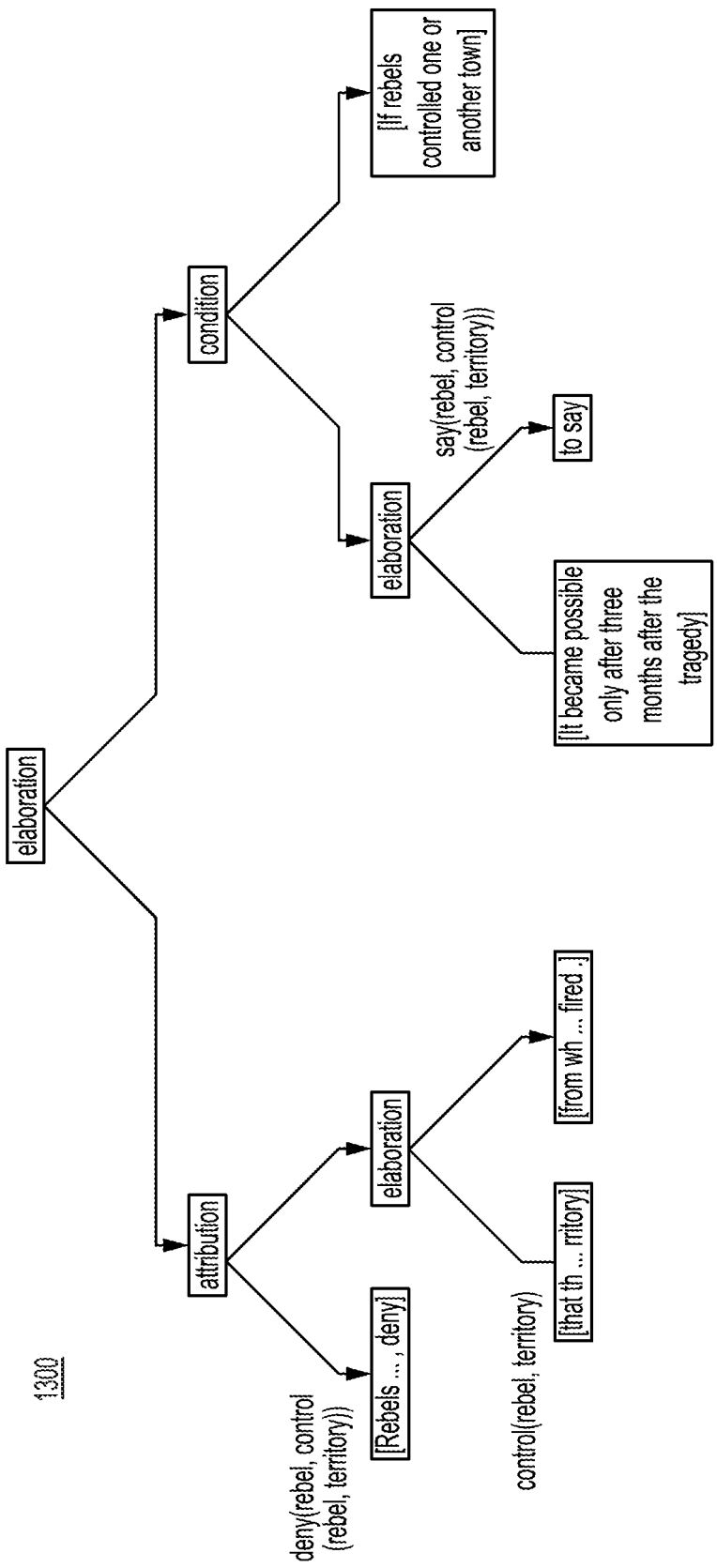
FIG. 13 illustrates a communicative discourse tree for a claim of a third agent in accordance with an aspect.

FIG. 13 illustrates a communicative discourse tree for a claim of a third agent in accordance with an aspect. FIG. 13 depicts communicative discourse tree 1300, which represents the following text: "Rebels, the self-proclaimed Donetsk People's Republic, deny that they controlled the territory from which the missile was allegedly fired. It became possible only after three months after the tragedy to say if rebels controlled one or another town."

As can be seen from communicative discourse trees 1100-1300, a response is not arbitrary. A response talks about the same entities as the original text. For example, communicative discourse trees 1190 and 1300 are related to communicative discourse tree 1100. A response backs up a disagreement with estimates and sentiments about these entities, and about actions of these entities.

More specifically, replies of involved agent need to reflect the communicative discourse of the first, seed message. As a simple observation, because the first agent uses Attribution to communicate his claims, the other agents have to follow the suite and either provide their own attributions or attack the validity of attribution of the proponent, or both. To capture a broad variety of features for how communicative structure of the seed message needs to be retained in consecutive messages, pairs of respective CDTs can be learned.

To verify the agreement of a request-response, discourse relations or speech acts (communicative actions) alone are often insufficient. As can be seen from the example depicted in FIGS. 11-13, the discourse structure of interactions between agents and the kind of interactions are useful. However, the domain of interaction (e.g., military conflicts or politics) or the subjects of these interactions, i.e., the entities, do not need to be analyzed.

Representing Rhetoric Relations and Communicative Actions

In order to compute similarity between abstract structures, two approaches are frequently used: (1) representing these structures in a numerical space, and express similarity as a number, which is a statistical learning approach, or (2) using a structural representation, without numerical space, such as trees and graphs, and expressing similarity as a maximal common sub-structure. Expressing similarity as a maximal common sub-structure is referred to as generalization.

Learning communicative actions helps express and understand arguments. Computational verb lexicons help support acquisition of entities for actions and provide a rule-based form to express their meanings. Verbs express the semantics of an event being described as well as the relational information among participants in that event, and project the syntactic structures that encode that information. Verbs, and in particular communicative action verbs, can be highly variable and can display a rich range of semantic behaviors. In response, verb classification helps a learning systems to deal with this complexity by organizing verbs into groups that share core semantic properties.

VerbNet is one such lexicon, which identifies semantic roles and syntactic patterns characteristic of the verbs in each class and makes explicit the connections between the syntactic patterns and the underlying semantic relations that can be inferred for all members of the class. See Karin Kipper, Anna Korhonen, Neville Ryant and Martha Palmer, Language Resources and Evaluation, Vol. 42, No. 1 (March 1908), at 21. Each syntactic frame, or verb signature, for a class has a corresponding semantic representation that details the semantic relations between event participants across the course of the event.

For example, the verb amuse is part of a cluster of similar verbs that have a similar structure of arguments (semantic roles) such as amaze, anger, arouse, disturb, and irritate. The roles of the arguments of these communicative actions are as follows: Experiencer (usually, an animate entity), Stimulus, and Result. Each verb can have classes of meanings differentiated by syntactic features for how this verb occurs in a sentence, or frames. For example, the frames for amuse are as follows, using the following key noun phrase (NP), noun (N), communicative action (V), verb phrase (VP), adverb (ADV):

NP V NP. Example: "The teacher amused the children." Syntax: Stimulus V Experiencer. Clause: amuse(Stimulus, E, Emotion, Experiencer), cause(Stimulus, E), emotional_state(result(E), Emotion, Experiencer).

NP V ADV-Middle. Example: "Small children amuse quickly." Syntax: Experiencer V ADV. Clause: amuse(Experiencer, Prop):—, property(Experiencer, Prop), adv(Prop).

NP V NP-PRO-ARB. Example "The teacher amused." Syntax Stimulus V. amuse(Stimulus, E, Emotion, Experiencer): cause(Stimulus, E), emotional_state(result(E), Emotion, Experiencer).

NP.cause V NP. Example "The teacher's dolls amused the children." syntax Stimulus <+genitive>('s) V Experiencer. amuse(Stimulus, E, Emotion, Experiencer): cause(Stimulus, E), emotional_state(during(E), Emotion, Experiencer).

NP V NP ADJ. Example "This performance bored me totally." syntax Stimulus V Experiencer Result. amuse(Stimulus, E, Emotion, Experiencer). cause(Stimulus, E), emotional_state(result(E), Emotion, Experiencer), Pred(result(E), Experiencer).

Communicative actions can be characterized into clusters, for example:
Verbs with Predicative Complements (Appoint, characterize, dub, declare, conjecture, masquerade, orphan, captain, consider, classify), Verbs of Perception (See, sight, peer). Verbs of Psychological State (Amuse, admire, marvel, appeal), Verbs of Desire (Want, long).
Judgment Verbs (Judgment), Verbs of Assessment (Assess, estimate), Verbs of Searching (Hunt, search, stalk, investigate, rummage, ferret), Verbs of Social Interaction (Correspond, marry, meet, battle), Verbs of Communication (Transfer(message), inquire, interrogate, tell, manner(speaking), talk, chat, say, complain, advise, confess, lecture, overstate, promise). Avoid Verbs (Avoid), Measure Verbs, (Register, cost, fit, price, bill), Aspectual Verbs (Begin, complete, continue, stop, establish, sustain.

Aspects described herein provide advantages over statistical learning models. In contrast to statistical solutions, aspects use a classification system can provide a verb or a verb-like structure which is determined to cause the target feature (such as rhetoric agreement). For example, statistical machine learning models express similarity as a number, which can make interpretation difficult.

Representing Request-Response Pairs

Representing request-response pairs facilitates classification based operations based on a pair. In an example, request-response pairs can be represented as parse thickets. A parse thicket is a representation of parse trees for two or more sentences with discourse-level relationships between words and parts of the sentence in one graph. See Galitsky 1915. Topical similarity between question and answer can expressed as common sub-graphs of parse thickets. The higher the number of common graph nodes, the higher the similarity.

Figure 14:
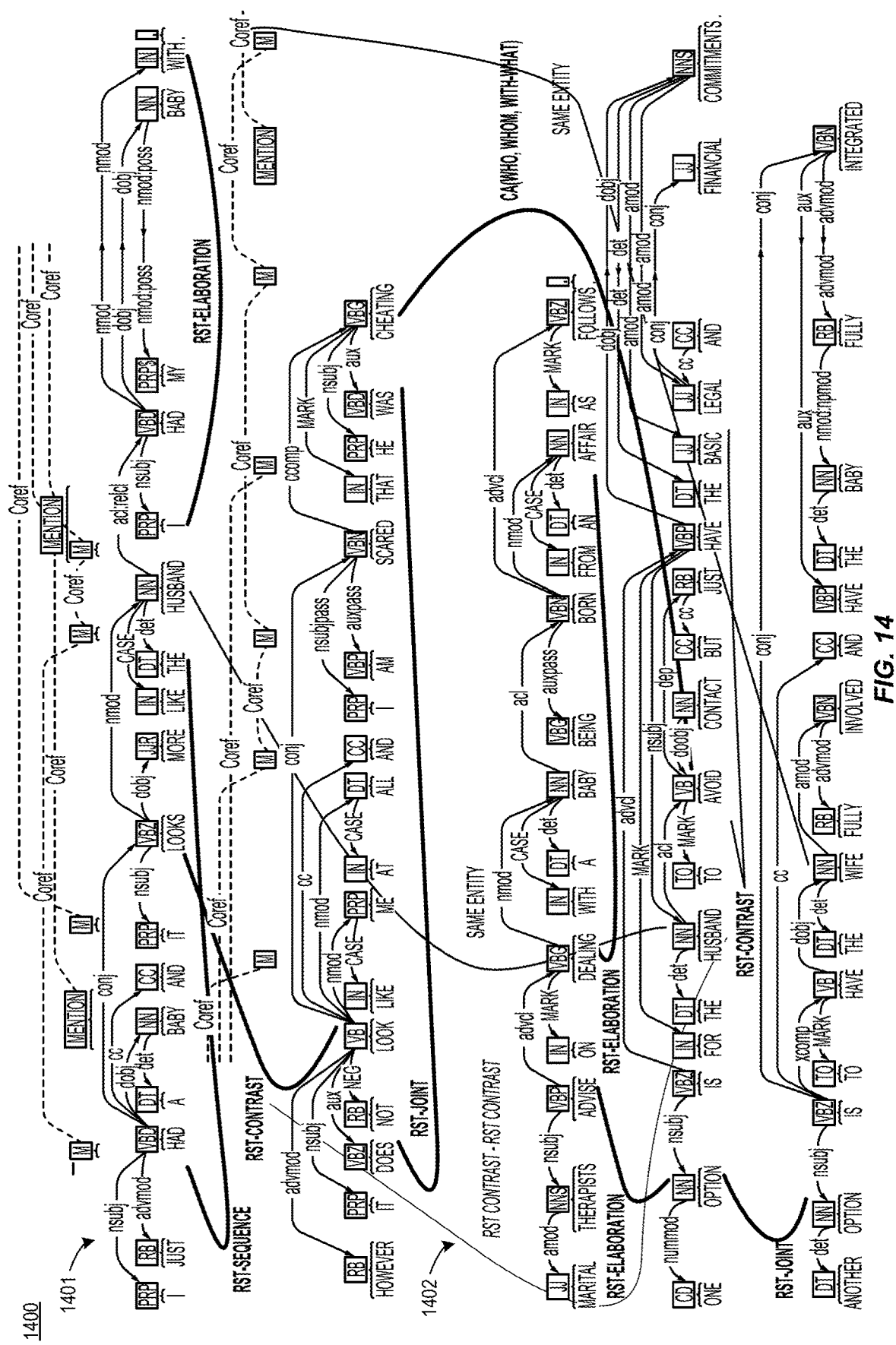
FIG. 14 illustrates parse thickets in accordance with an aspect.

FIG. 14 illustrates parse thickets in accordance with an aspect. FIG. 14 depicts parse thicket 1400 including a parse tree for a request 1401, and a parse tree for a corresponding response 1402.

Parse tree 1401 represents the question "I just had a baby and it looks more like the husband I had my baby with. However it does not look like me at all and I am scared that he was cheating on me with another lady and I had her kid. This child is the best thing that has ever happened to me and I cannot imagine giving my baby to the real mom."

Response 1402 represents the response "Marital therapists advise on dealing with a child being born from an affair as follows. One option is for the husband to avoid contact but just have the basic legal and financial commitments. Another option is to have the wife fully involved and have the baby fully integrated into the family just like a child from a previous marriage."

FIG. 14 represents a greedy approach to representing linguistic information about a paragraph of text. The straight edges of this graph are syntactic relations, and curvy arcs are discourse relations, such as anaphora, same entity, sub-entity, rhetoric relation and communicative actions. The solid arcs are for same entity/sub-entity/anaphora relations, and the dotted arcs are for rhetoric relations and communicative actions. Oval labels in straight edges denote the syntactic relations. Lemmas are written in the boxes for the nodes, and lemma forms are written on the right side of the nodes.

Parse thicket 1400 includes much richer information than just a combination of parse trees for individual sentences. Navigation through this graph along the edges for syntactic relations as well as arcs for discourse relations allows to transform a given parse thicket into semantically equivalent forms for matching with other parse thickets, performing a text similarity assessment task. To form a complete formal representation of a paragraph, as many links as possible are expressed. Each of the discourse arcs produces a pair of thicket phrases that can be a potential match.

Topical similarity between the seed (request) and response is expressed as common sub-graphs of parse thickets. They are visualized as connected clouds. The higher the number of common graph nodes, the higher the similarity. For rhetoric agreement, common sub-graph does not have to be large as it is in the given text. However, rhetoric relations and communicative actions of the seed and response are correlated and a correspondence is required.

Generalization for Communicative Actions

A similarity between two communicative actions $A_1$ and $A_2$ is defined as a an abstract verb which possesses the features which are common between $A_1$ and $A_2$. Defining a similarity of two verbs as an abstract verb-like structure supports inductive learning tasks, such as a rhetoric agreement assessment. In an example, a similarity between the following two common verbs, agree and disagree, can be generalized as follows: agree^disagree=verb(Interlocutor, Proposed_action, Speaker), where Interlocution is the person who proposed the Proposed_action to the Speaker and to whom the Speaker communicates their response. Proposed_action is an action that the Speaker would perform if they were to accept or refuse the request or offer, and The Speaker is the person to whom a particular action has been proposed and who responds to the request or offer made.

In a further example, a similarity between verbs agree and explain is represented as follows: agree^explain=verb(Interlocutor, *, Speaker). The subjects of communicative actions are generalized in the context of communicative actions and are not be generalized with other "physical" actions. Hence, aspects generalize individual occurrences of communicative actions together with corresponding subjects.

Additionally, sequences of communicative actions representing dialogs can be compared against other such sequences of similar dialogs. In this manner, the meaning of an individual communicative action as well as the dynamic discourse structure of a dialogue is (in contrast to its static structure reflected via rhetoric relations) is represented. A generalization is a compound structural representation that happens at each level. Lemma of a communicative action is generalized with lemma, and its semantic role are generalized with respective semantic role.

Communicative actions are used by text authors to indicate a structure of a dialogue or a conflict. See Searle, J. R. 1969, Speech acts: an essay in the philosophy of language. London: Cambridge University Press. Subjects are generalized in the context of these actions and are not generalized with other "physical" actions. Hence, the individual occurrences of communicative actions together are generalized with their subjects, as well as their pairs, as discourse "steps."

Generalization of communicative actions can also be thought of from the standpoint of matching the verb frames, such as VerbNet. The communicative links reflect the discourse structure associated with participation (or mentioning) of more than a single agent in the text. The links form a sequence connecting the words for communicative actions (either verbs or multi-words implicitly indicating a communicative intent of a person).

Communicative actions include an actor, one or more agents being acted upon, and the phrase describing the features of this action. A communicative action can be described as a function of the form: verb (agent, subject, cause), where verb characterizes some type of interaction between involved agents (e.g., explain, confirm, remind, disagree, deny, etc.), subject refers to the information transmitted or object described, and cause refers to the motivation or explanation for the subject.

A scenario (labeled directed graph) is a sub-graph of a parse thicket G=(V, A), where V={action$_1$, action$_2$ . . . action$_n$} is a finite set of vertices corresponding to communicative actions, and A is a finite set of labeled arcs (ordered pairs of vertices), classified as follows:

Each arc action$_i$, action$_j$∈A$_{sequence}$ corresponds to a temporal precedence of two actions $v_i$, $ag_i$, $s_i$, $c_i$ and $v_j$, $ag_j$, $s_j$, $c_j$ that refer to the same subject, e.g., $s_i$=$s_j$ or different subjects. Each arc action$_i$, action$_j$∈A$_{cause}$ corresponds to an attack relationship between action$_i$ and action$_j$ indicating that the cause of action$_i$ in conflict with the subject or cause of action$_j$.

Subgraphs of parse thickets associated with scenarios of interaction between agents have some distinguishing features. For example, (1) all vertices are ordered in time, so that there is one incoming arc and one outgoing arc for all vertices (except the initial and terminal vertices), (2) for A$_{sequence}$ arcs, at most one incoming and only one outgoing arc are admissible, and (3) for A$_{cause}$ arcs, there can be many outgoing arcs from a given vertex, as well as many incoming arcs. The vertices involved may be associated with different agents or with the same agent (i.e., when he contradicts himself). To compute similarities between parse thickets and their communicative action, induced subgraphs, the subgraphs of the same configuration with similar labels of arcs and strict correspondence of vertices are analyzed.

The following similarities exist by analyzing the arcs of the communicative actions of a parse thicket: (1) one communicative action from with its subject from T1 against another communicative action with its subject from T2 (communicative action arc is not used), and (2) a pair of communicative actions with their subjects from T1 compared to another pair of communicative actions from T2 (communicative action arcs are used).

Generalizing two different communicative actions is based on their attributes. See (Galitsky et al 1913). As can be seen in the example discussed with respect to FIG. 14, one communicative action from T1, cheating(husband, wife, another lady) can be compared with a second from T2, avoid(husband, contact(husband, another lady)). A generalization results in communicative_action(husband, *) which introduces a constraint on A in the form that if a given agent (=husband) is mentioned as a subject of CA in Q, he(she) should also be a subject of (possibly, another) CA in A. Two communicative actions can always be generalized, which is not the case for their subjects: if their generalization result is empty, the generalization result of communicative actions with these subjects is also empty.

Generalization of RST Relations

Some relations between discourse trees can be generalized, such as arcs that represent the same type of relation (presentation relation, such as antithesis, subject matter relation, such as condition, and multinuclear relation, such as list) can be generalized. A nucleus or a situation presented by a nucleus is indicated by "N." Satellite or situations presented by a satellite, are indicated by "S." "W" indicates a writer. "R" indicates a reader (hearer). Situations are propositions, completed actions or actions in progress, and communicative actions and states (including beliefs, desires, approve, explain, reconcile and others). Generalization of two RST relations with the above parameters is expressed as:

$$rst1(N1,S1,W1,R1)^\wedge rst2(N2,S2,W2,R2)=$$

$$(rst1^\wedge rst2)(N1^\wedge N2,S1^\wedge S2,W1^\wedge W2,R1^\wedge R2).$$

The texts in N1, S1, W1, R1 are subject to generalization as phrases. For example, rst1 rst2 can be generalized as follows: (1) if relation_type(rst1)!=relation_type(rst2) then a generalization is empty. (2) Otherwise, the signatures of rhetoric relations are generalized as sentences: sentence(N1, S1, W1, R1) sentence(N2, S2, W2, R2). See Iruskieta, Mikel, Iria da Cunha and Maite Taboada. A qualitative comparison method for rhetorical structures: identifying different discourse structures in multilingual corpora. Lang Resources & Evaluation. June 1915, Volume 49, Issue 2.

For example, the meaning of rst—background^rst—enablement=(S increases the ability of R to comprehend an element in N)^(R comprehending S increases the ability of R to perform the action in N)=increase-VB the-DT ability-NN of-IN R-NN to-IN.

Because the relations rst—background^rst—enablement differ, the RST relation part is empty. The expressions that are the verbal definitions of respective RST relations are then generalized. For example, for each word or a placeholder for a word such as an agent, this word (with its POS) is retained if the word the same in each input phrase or remove the word if the word is different between these phrases. The resultant expression can be interpreted as a common meaning between the definitions of two different RST relations, obtained formally.

Two arcs between the question and the answer depicted in FIG. 14 show the generalization instance based on the RST relation "RST-contrast". For example, "I just had a baby" is a RST-contrast with "it does not look like me," and related to "husband to avoid contact" which is a RST-contrast with "have the basic legal and financial commitments." As can be seen, the answer need not have to be similar to the verb phrase of the question but the rhetoric structure of the question and answer are similar. Not all phrases in the answer must match phrases in question. For example, the phrases that do not match have certain rhetoric relations with the phrases in the answer which are relevant to phrases in question.

Building a Communicative Discourse Tree

Figure 15:
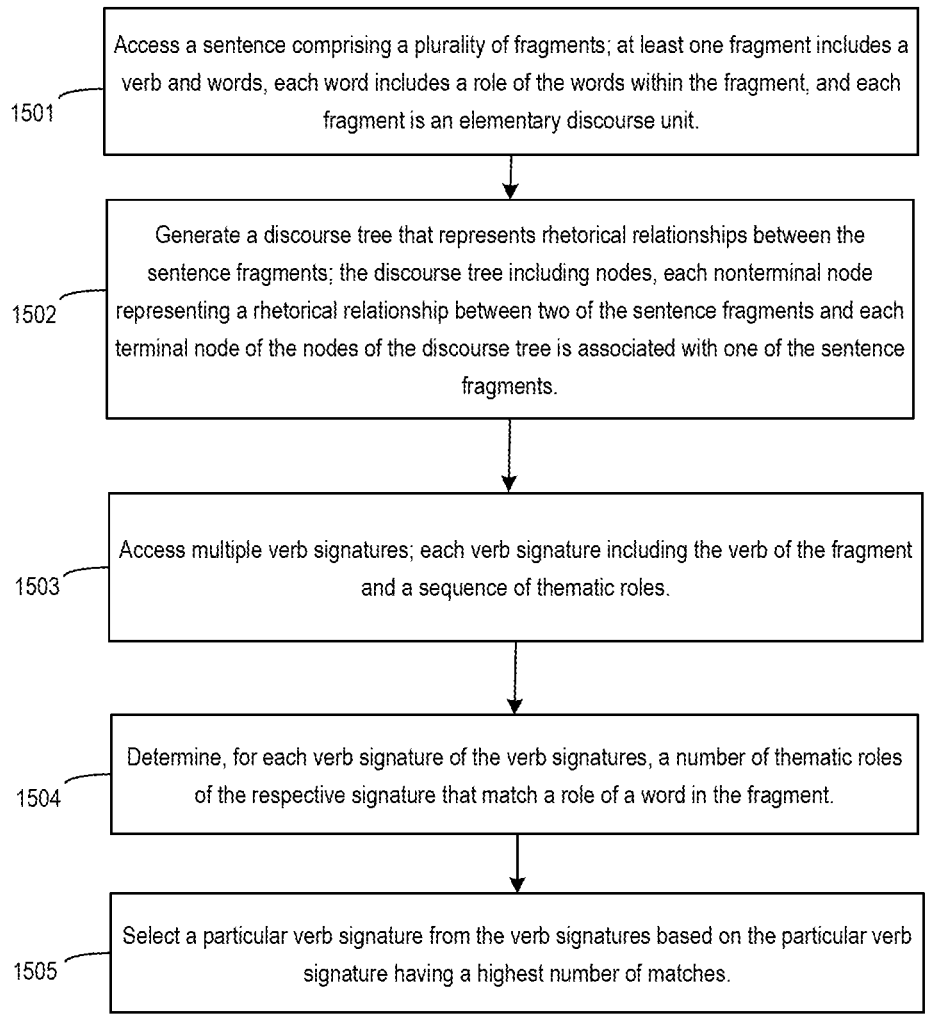
FIG. 15 illustrates an exemplary process for building a communicative discourse tree in accordance with an aspect.

FIG. 15 illustrates an exemplary process for building a communicative discourse tree in accordance with an aspect. Autonomous agent 114 can implement process 1500. As discussed, communicative discourse trees enable improved search engine results.

At block 1501, process 1500 involves accessing a sentence comprising fragments. At least one fragment includes a verb and words and each word includes a role of the words within the fragment, and each fragment is an elementary discourse unit. For example, autonomous agent 114 accesses a sentence such as "Rebels, the self-proclaimed Donetsk People's Republic, deny that they controlled the territory from which the missile was allegedly fired" as described with respect to FIG. 13.

Continuing the example, autonomous agent 114 determines that the sentence includes several fragments. For example, a first fragment is "rebels . . . deny." A second fragment is "that they controlled the territory." A third fragment is "from which the missile was allegedly fired." Each fragment includes a verb, for example, "deny" for the first fragment and "controlled" for the second fragment. Although, a fragment need not include a verb.

At block 1502, process 1500 involves generating a discourse tree that represents rhetorical relationships between the sentence fragments. The discourse tree including nodes, each nonterminal node representing a rhetorical relationship between two of the sentence fragments and each terminal node of the nodes of the discourse tree is associated with one of the sentence fragments.

Continuing the example, autonomous agent 114 generates a discourse tree as shown in FIG. 13. For example, the third fragment, "from which the missile was allegedly fired" elaborates on "that they controlled the territory." The second and third fragments together relate to attribution of what happened, i.e., the attack cannot have been the rebels because they do not control the territory.

At block 1503, process 1500 involves accessing multiple verb signatures. For example, autonomous agent 114 accesses a list of verbs, e.g., from VerbNet. Each verb matches or is related to the verb of the fragment. For example, the for the first fragment, the verb is "deny." Accordingly, autonomous agent 114 accesses a list of verb signatures that relate to the verb deny.

As discussed, each verb signature includes the verb of the fragment and one or more of thematic roles. For example, a signature includes one or more of noun phrase (NP), noun (N), communicative action (V), verb phrase (VP), or adverb (ADV). The thematic roles describing the relationship between the verb and related words. For example "the teacher amused the children" has a different signature from "small children amuse quickly." For the first fragment, the verb "deny," autonomous agent 114 accesses a list of frames, or verb signatures for verbs that match "deny." The list is "NP V NP to be NP," "NP V that S" and "NP V NP."

Each verb signature includes thematic roles. A thematic role refers to the role of the verb in the sentence fragment. Autonomous agent 114 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic.

At block 1504, process 1500 involves determining, for each verb signature of the verb signatures, a number of thematic roles of the respective signature that match a role of a word in the fragment. For the first fragment, rhetorical classification autonomous agent 114 determines that the verb "deny" has only three roles, "agent", "verb" and "theme."

At block 1505, process 1500 involves selecting a particular verb signature from the verb signatures based on the particular verb signature having a highest number of matches. For example, referring again to FIG. 13, deny in the first fragment "the rebels deny . . . that they control the territory" is matched to verb signature deny "NP V NP", and "control" is matched to control (rebel, territory). Verb signatures are nested, resulting in a nested signature of "deny (rebel, control(rebel, territory))."

Detecting Hypocrisy in Text

Disclosed techniques include detecting hypocrisy in text. One contemporary meaning of hypocrisy is saying one thing in public and doing another in private (e.g., when not observed by others). A hypocrite is a person who acts in contradiction to his or her stated beliefs or feelings. Philosophers and psychologists agree that hypocrisy entails attitude-inconsistent behaviors.

Detecting hypocrisy in text has wide applicability. For instance, detecting hypocrisy in text and in conversation (e.g. in the form of user utterances received from a user device) is useful for understanding a mood of a user, how the user perceives the current state of interaction with a business. For instance, if a customer is saying that he is appalled with hypocrisy from the company communicated with him, it would be hard to retain him unless certain communication and clarification efforts are made. On the other hand, if hypocrisy is detected in customer demands and descriptions of his problem, this customer should be handled carefully and strictly taking into account that this customer might be too demanding. The company is advised to watch spending associated with this customer.

It can be useful to differentiate a text where a writer is appalled with a perceived hypocrisy, or double-standards, from texts of different types, categories and genres because the optimal company's reaction would be totally different. Table 1, below, outlines some categories of text that could potentially be confused with hypocrisy, and an expected reaction:

TABLE 1

Categories of text written by a customer and company's optimal reaction. The focus of this section is in the bottom row

| Genre | Company's reaction |
| --- | --- |
| Sentiment-neutral, or opinion neutral text | Acknowledge and promise to the customer that her thoughts would be taken into account |
| Sarcastic text | Acknowledge that the problem raised is understood, and confirm that it would be taken seriously, even if it is impossible or too costly to fix |
| Texts including demands for company actions | Acknowledgement that the desired action would be performed or a rejection, ideally with explanation why it cannot be done |
| Texts with heated argument | Agreeing or disagreeing, with backing up the company's decision |
| Text indicating an interest in a recommendation | Produce a recommendation |
| Hypocrisy | Acknowledge the issue and properly communicate it. Make sure the hypocrisy is resolved in the customer's mind |

Hypocrisy can be found in complaints from customers. In these cases, upset customers mostly cite the company's behavior as hypocritical. However, in some cases one can observe that the customer plot indicates his own hypocrisy: the customer is first saying one thing but then acts differently. For example a customer may make a request to return a product claiming "I will never use it." But if this request is followed by another request to provide more instructions on how to use this product (indicating that this product is used), the sequence is hypocritical. Customers sometimes swear they would never go to a particular branch of a bank but soon contact this branch on multiple occasions in an attempt to resolve new problems. Hypocrisy is frequently associated with an explanation behind returning a product: "This dress is of a wrong size", followed by buying another item of the same size.

Figure 16:
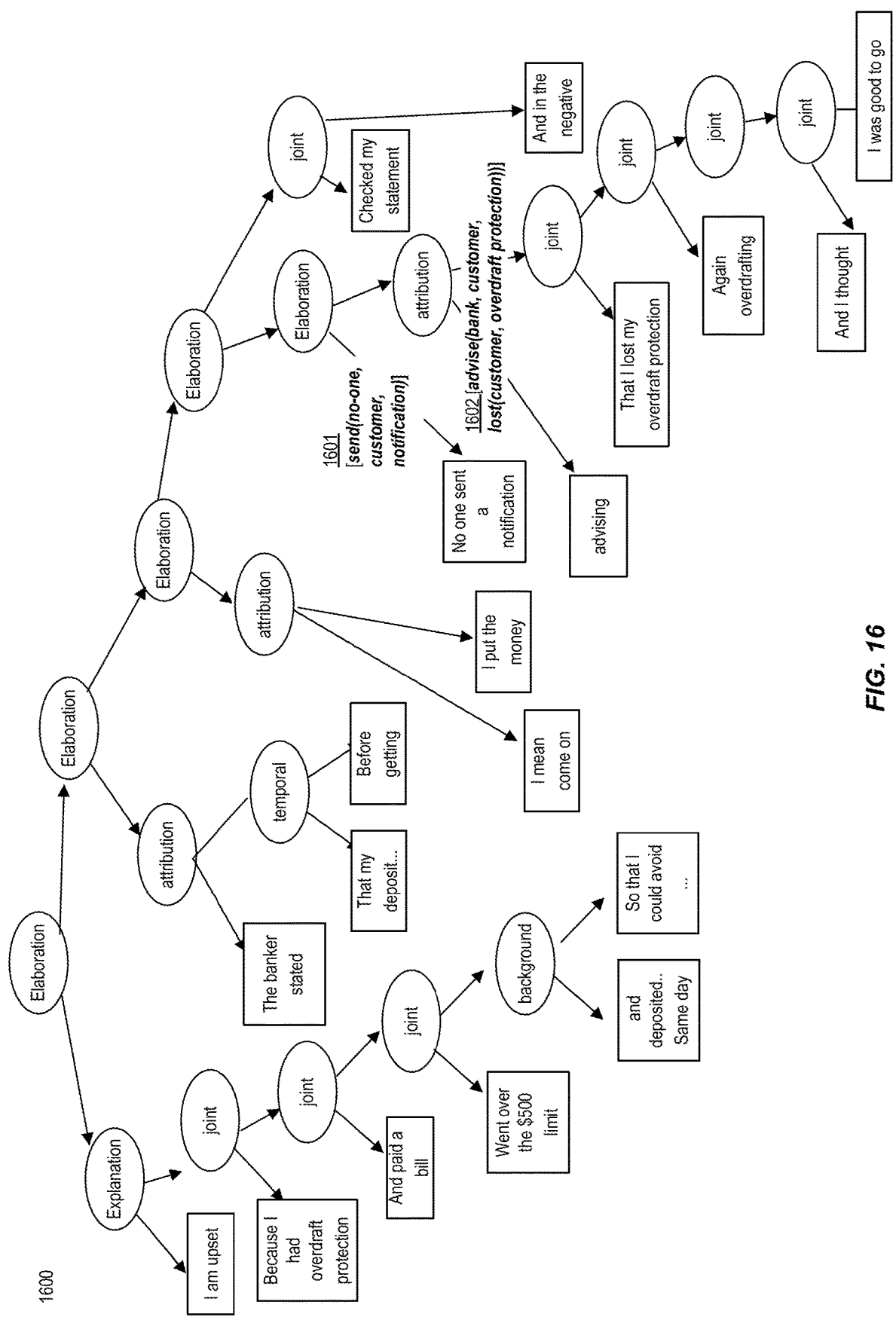
FIG. 16 illustrates a communicative discourse tree that illustrates a hypothetical scenario, in accordance with an aspect.

FIG. 16 illustrates a communicative discourse tree that illustrates a hypothetical scenario, in accordance with an aspect. FIG. 16 depicts communicative discourse tree 1600, which includes various nodes such as terminal nodes representing elementary discourse units and non-terminal nodes representing rhetorical relations. The text depicted in communicative discourse tree 1600 is:

I am upset because I had overdraft protection and paid a bill, went over the 500 dollar limit and deposited the money back into the bank the same day so that I could avoid being penalized. The banker stated that my deposit should hit my account before getting penalized for going 23 dollars over. I mean come on, I put the money back into the account the same day! No one sent a notification advising that I lost my overdraft protection and so I paid my insurance, again overdrafting the account and thought I was good to go. Checked my statement only to find a rejected payment and in the negative in top of overdraft fees and a cancelled insurance policy.

Communicative discourse tree 1600 includes communicative actions 1601 and 1602. Communicative action 1601 is "send(no one, customer, notification)]" and communicative_action 1602 is "[advise(bank, customer, lost (customer, overdraft protection))]. In this text, there is an assumption of responsibility on the part of a bank. The customer is saying 'you did this' assuming that this bank in particular, as well as most other banks, are supposed to do 'that'. A reader would trust this complaint writer in how the actions of this bank are described, so the hypocrisy is genuine here. The customer attaches an expression of disbelief 'come on' to the action of the bank.

Naturally, hypocrisy as a logical construction can be tracked in a discourse tree. Here, the Say part of a hypocrisy that is not explicitly mentioned in text but is assumed. The Do part is explicit in this text and should be detected. Communicative actions (CA) in the Say part are frequently assumed but not explicit in text, so it is even harder to detect hypocrisy in this case. However, "no one <CA(bank, What)>me" ([send(no-one, customer, notification)]) indicates that Say=CA(bank, me, What) together with the explicit Do part (here, Do=reject(bank, me, Identifying Classes of Hypocrisy Various classes of hypocrisy can be identified. These classes identify additional relationships between linguistic components "say" and "do." The Do parts can include an intent to deceive (rows two to four). Table 4 below, shows different classes.

TABLE 4

The classes of sentences with hypocrisy

| Class | Sentence | Comment/explanation of hypocrisy |
|---|---|---|
| Intent to deceive | A parent who was a recreational drug user in his heyday but who now discourages his son to use drugs | intent to deceive others about one's attitudes or values is not necessarily required to judge an actor's behavior as hypocritical |
| | A woman, Jane, expresses the belief that premarital sex is wrong but does not disguise the fact that she is sexually active despite being unmarried | intent to deceive is not seen as necessary by laypeople to label an action as hypocritical |
| | Paul believes that people should eat only healthy food, although he eats junk food himself. He tells others that he eats junk food | People know someone believes in Say but does contradicting Do confirming that he has done that Do |
| Weakness of will | A woman who has been active in anti-drug campaigns, and who has resisted even prescription medications for a severe back injury, gives in one day to the temptation to ease her pain, but then never again takes any drugs | Failures of the will are often seen as distinct from hypocrisy, at least when they represent momentary lapses |
| | Priest who preaches against adultery is pursued by a married woman. He resists her advances for months, but then finally gives in | Repeated lapses are tend to be judged as hypocritical |
| | Woman promises herself and her family that she is going to remain celibate until she is married. Then she decides that premarital sex is not wrong. | Say one thing for the future then Do the opposite |
| Self-deception | A student who parties far more than he studies, realizes that he is a poor student but is nevertheless critical of others who he believes are not serious students | Some cases of self-deception are indistinct from hypocrisy; in particular, those in which actor must go to great lengths to maintain their delusions while simultaneously denigrating others who engage in the same behaviors |
| | College student has strong feelings of attraction to other men, but is active in an anti-gay organization. At the same time, the student is aware that he is gay. | Self deception can be expressed by deceive(student, student, acceptable(gay(student)) & not acceptable(gay(Anyone))) |

TABLE 4-continued

The classes of sentences with hypocrisy

| Class | Sentence | Comment/explanation of hypocrisy |
|---|---|---|
| Degree of discrepancy | A parent, who forbids his daughter to get a tattoo, is described as a cigarette smoker, someone with body piercings, or the possessor of a tattoo | Degree of discrepancy between attitudes and behavior affects the frequency with which hypocrisy is ascribed |
| | A student who ate three cheeseburgers for lunch subsequently helped in a community program to raise awareness about exercise, or walked in a relay to support the fight against heart disease | Actors whose behaviors contradict their own attitudes are critical of others who do the same suffices to conclude about hypocrisy |
| | A man who visited the X-rated section of a video store. Later in the day, he protested casino gambling, helped at a church bake sale and also helped in a community program to eliminate pornography | |
| | A person who signs a private contract handed out at school that they will use condoms and then has unsafe sex | |
| Reversing order | Pat is sitting on the couch, eating and watching TV for a week, and gaining five pounds; however, two weeks later, Pat makes a public statement indicating that people should be proactive in pursuing a healthier lifestyle | The reverse order would increase the likelihood that the inconsistency between the statement and the behavior would be attributed to the change of target rather than to hypocrisy |
| | Mrs. Grace laments about the terrible conditions of the Mruna tribe in Africa, promising financial aid and support for the missionary who is attempting to Christianize them. But her charity obviously does not begin at home: she resents the mood of black population in her town and she considers firing her black maid for being "sulky." | One person is expected to advocate for a tolerance to a certain category of people and be tolerant himself before and after his act of advocating |

Templates can be developed for sentences with hypocrisy. In psychological terms, hypocritical statements establish personal standard and then commit a behavior that violates that standard, and it does not matter if that standard is consistent or inconsistent with social norms. Such a personal standard can be referred to as a prominent entity (of Saying) and then consider this behavior that violates this standard as Doing. Hence out top-level template is Say . . . <RST-contrast> . . . Do. 'RST-contrast' is a rhetorical relation of contrast between a two respective parts of a sentence.

A template can cover or not cover a given sentence. Syntactic generalizations of a template and a sentence to be covered can be computed. If all syntactic features from the template are retained in the generalization results, then a template covers this sentence.
Verb strengthening/attenuating [Prominent entity] <RST-Contrast> Verb strengthening/attenuating/neutral [opposite prominent feature]
Positive sentiment [Prominent entity] <RST-Contrast> Negative sentiment=>[similar prominent entity].

This is an example of a perceived expression of hypocrisy (which is a controversy) for a historical period following a classical writer and social critic: 'Charles Dickens stood for all the Victorian virtues such as kindness, and sympathy for the down-trodden, but his novels exposed the violence, hypocrisy, greed, and cruelty of this age.' (Where "+" means positive sentiment and "−" means negative sentiment). This text can be generalized to obtain the template Person . . . action viewpoint1 +++ Persons' object action viewpoint2 −−−

In another example, the following quotes of Arthur Schopenhauer and Leo Tolstoy define a partial case of hypocrisy. These quotes are covered by our templates and even implicitly follow Say-Do paradigm:
'With people of limited ability modesty is merely honesty. But with those who possess great talent it is hypocrisy.'
'Hypocrisy in anything whatever may deceive the cleverest and most penetrating man, but the least wide-awake of children recognizes it, and is revolted by it, however ingeniously it may be disguised'.

The rhetorical relation Contrast is present in a discourse tree for a definition of hypocrisy.

Figure 17:
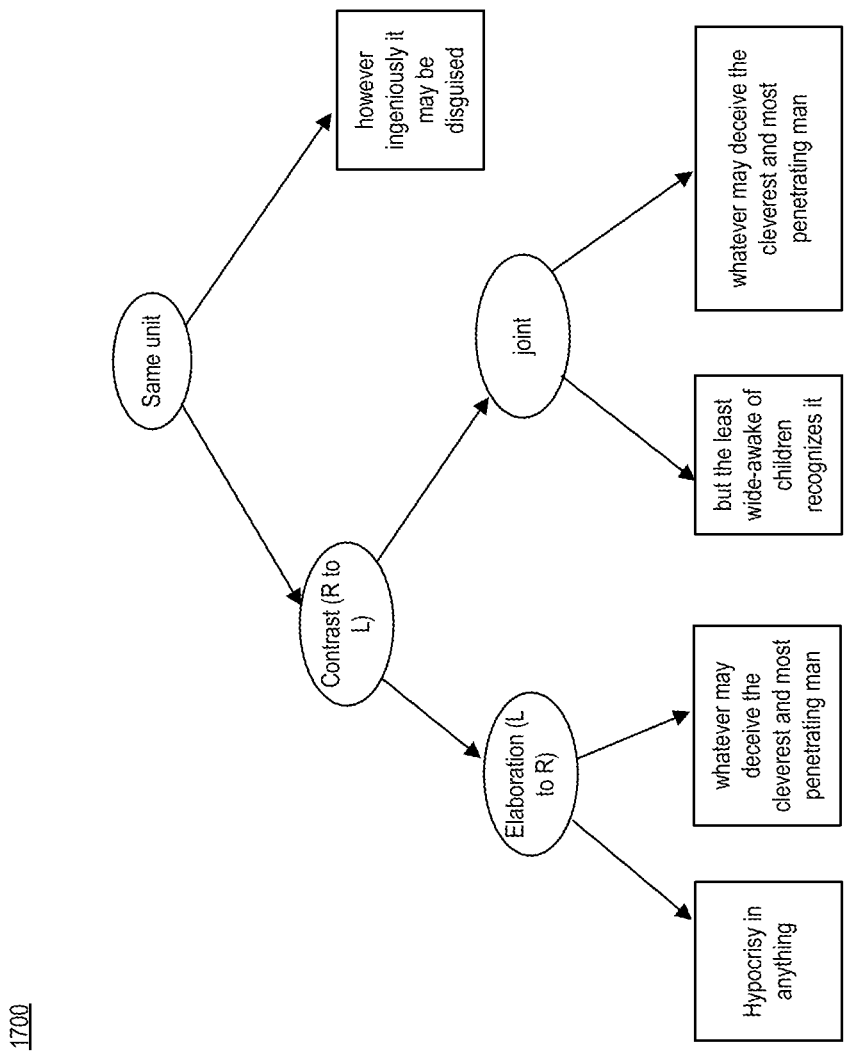
FIG. 17 illustrates a communicative discourse tree that illustrates a hypothetical scenario, in accordance with an aspect.

FIG. 17 illustrates a communicative discourse tree that illustrates a hypothetical scenario, in accordance with an aspect. FIG. 17 includes communicative discourse tree 1700, which represents the following text: "Hypocrisy in anything whatever may deceive the cleverest and most penetrating man, but the least wide-awake of children recognizes it, and is revolted by it, however ingeniously it may be disguised." The opposing prominent entities are 'limited ability' vs 'great talent' and 'cleverest and most penetrating' vs 'wide-awake of children'.

Considering another example, a quote of Jean Kerr is more explicit in terms of Say—Do. The meaning of the following is: first Say (polite)=>Do (polite):
'Man is the only animal that learns by being hypocritical. He pretends to be polite and then, eventually, he becomes polite.'

Considering yet another example of a controversy and contradiction, US Congresswoman Ilhan Omar) made the statement that follows: 'As an immigrant, I truly believed when I was coming to this country that people had the tools necessary to live a life that is prosperous. But we cannot figure out how to house our homeless people.' This does not represent a hypocrisy of the person saying this, because pronoun We (not 1) is used in this text. Otherwise, it is covered by the hypocrisy template.

Hypocrisy in Short Texts or Utterances

There exists a good set of tweets with hashtag hypocrite on Twitter. Some tweets, for example, are covered by the hypocrisy templates identified above.

"Sooo #TheCircle Sammie says Ella and Woody picked each other cos they are besties. But then she does the exact same by saying Tim is her biggest competition? #Hypocrite #TeamElla #TeamWoody #TeamGeorgina"

"@MeghanMc has no political sense. She cares about Kurds but not children locked up in cages. #Hypocrite"

Some tweets in this set have only the "Do" part, and it is hard to identify such tweet as a text with hypocrisy, for example:

"Person says . . . but then person does
Person speaks loud/crying crocodile tears— . . . but try/turns blind eye— . . . "

Some tweets have neither parts and express hypocrisy explicitly "They bought a pipeline.
They're still taking Indigenous youth to court.
They haven't even met Harper's environmental targets.
Trudeau violated his own ethics law. TWICE!"
The template here is violated/broke/cheat/deceive his/her/their own . . . .

The following template matches the template <Person1> <Person1feature->but/yet <Person2> <Person2feature>
'So Beth Moore who shares the Gospel is a stain on the church but a heretic like Paula White is a leading evangelical's good friend? Mhmmm I wonder what's the common denominator . . . let's see could it be that her allegiance to Trump is greater than the Gospel'

Templates for hypocritical tweets can be applied as follows:

'Must have one of the biggest carbon footprints going, so to preach to us about climate change is an absolute joke
<Person> must have <prominent entity-> so to <do> <positive> change is an absolute joke If you call Biden's son a criminal what do u call @ivanka who's rcvd almost 50 trademarks from China since daddy's been in office?
If you call <Person1>—what do you call <Person2 who—<action>
Why are so called <Person-Category> silent on this?
How pro-<concept1> is your stance/viewpoint/position on <concept2>? I <mental_state> your <concept3>
Funny how @KingJames preaches being "more than an athlete", but is afraid to stand up for democracy when it's gonna hurt the bank.
Funny how <person> preaches being <concept1>, but is afraid to stand up for <concept2> when it's gonna hurt
Says the man who <verb1-> and <verb2->. <verb1->=drives expensive car
So your concept+> matters but others should verb->
What's worse is that Facebook is only implementing their "standards" to ordinary people but not to those who have money or power.

Figure 18:
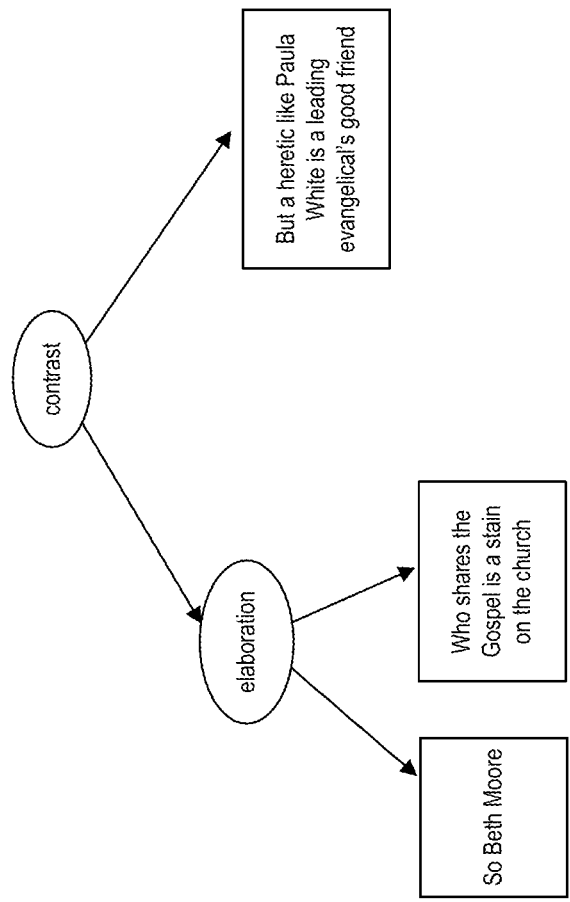
FIG. 18 illustrates a communicative discourse tree that illustrates a hypothetical scenario, in accordance with an aspect.

FIG. 18 illustrates a communicative discourse tree that illustrates a hypothetical scenario, in accordance with an aspect. FIG. 18 represents communicative discourse tree 1800, which is for the sentence: "So Beth Moore who shares the Gospel is a stain on the church but a heretic like Paula White is a leading evangelica's good friend." Notice that but as a discourse marker is needed to indicate rhetorical relation of contrast.

Example of a Method for Identifying Hypocrisy in Text

Figure 19:
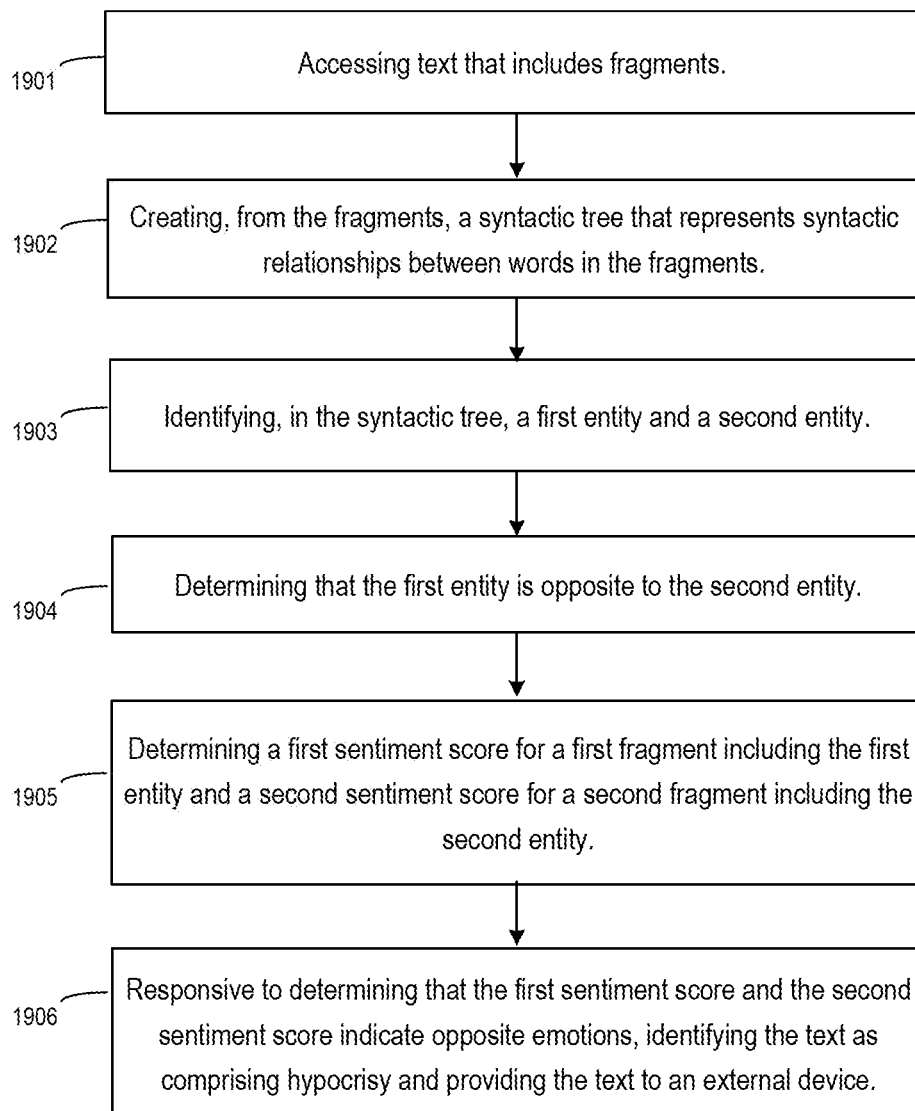
FIG. 19 illustrates an exemplary process for detecting hypocrisy in text, in accordance with an aspect.

FIG. 19 illustrates an exemplary process 1900 for detecting hypocrisy in text, in accordance with an aspect. Hypocrisy can be detected in dialogue by identifying a sudden change in a mood as reflected in the sentiment of each utterance.

At block 1901, process 1900 involves accessing text that includes fragments. For instance, autonomous agent 119 accesses utterances from user device 190. In an example, autonomous agent 119 accesses the following text:

Speaker 1: The Oath is commonly attributed to Hippocrates, the father of modern medicine, who lived in ancient Greece from about 460 to 370 BC.

Speaker 2: Oath makes doctors promise not to practice surgery, at least abdominal surgery.

Speaker 1: This is one of its most perplexing clauses of the Oath!

Speaker 2: The surgery was considered an inferior profession in ancient times—it usually resulted in the death of the patient.

Speaker 1: Surgery is now an integral lifesaving tool used every day by highly skilled physicians. So it's quite disconcerting to find that our anti-choice activists do not want doctors to do surgery.

Speaker 2: We want all doctors to swear by the gods that they will never pick up a scalpel."

As can be seen, the text above includes utterances from two speakers—speaker 1 and speaker 2. Process 1900 identifies entities and sentiment within the utterances and determines sentiment therefrom.

At block 1902, process 1900 involves creating, from the fragments, a syntactic tree that represents syntactic relationships between words in the fragments. Autonomous agent 119 creates a syntactic tree that represents the utterances. Syntactic trees include terminal nodes that are of the type sentence, noun phrase, verb phrase, verb, determiner (e.g., definite article), and noun.

Figure 20:
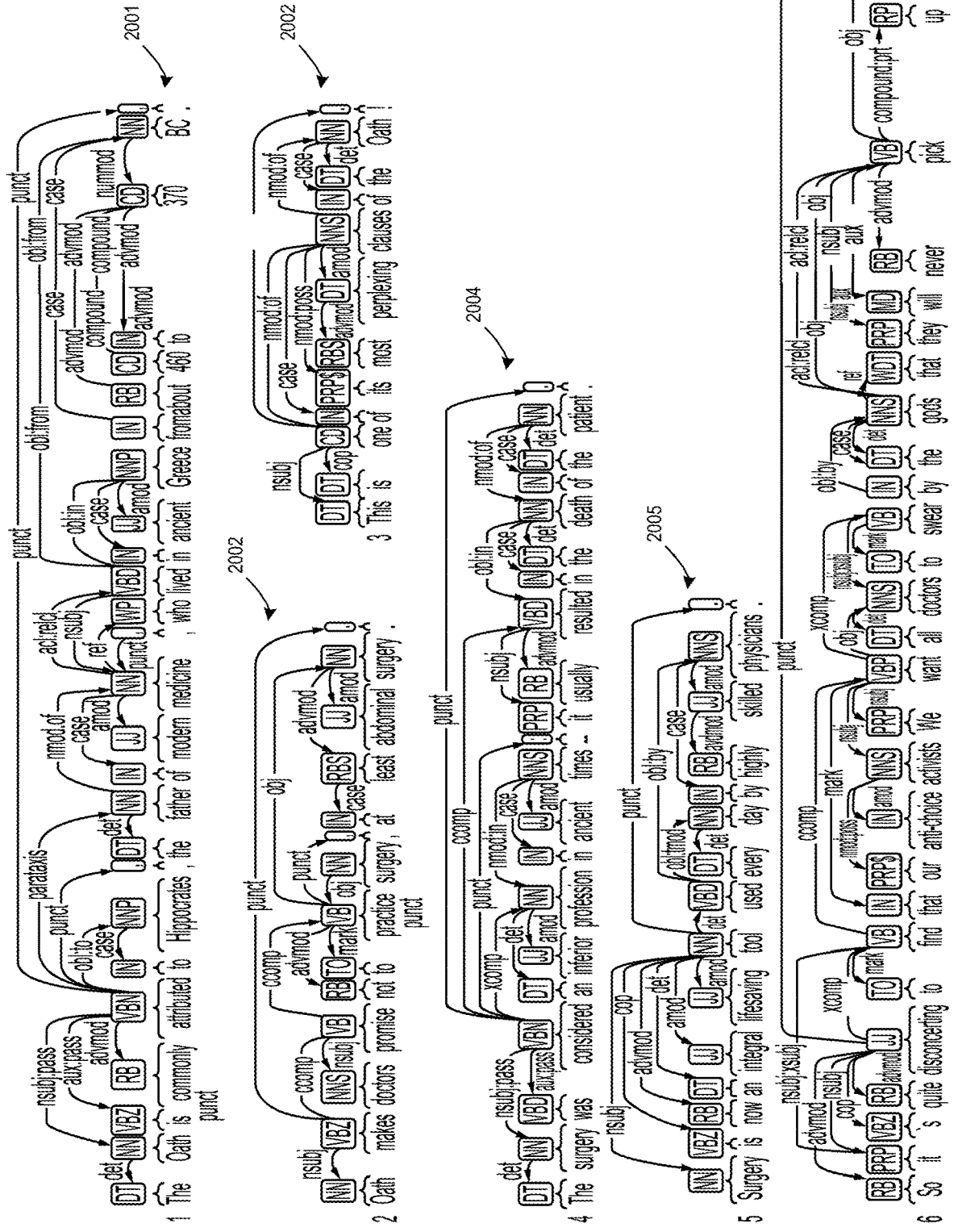
FIG. 20 illustrates examples of syntactic trees, in accordance with an aspect.

FIG. 20 illustrates examples of syntactic trees, in accordance with an aspect. FIG. 20 depicts syntactic trees 2001-2006, which represent the utterances in the text accessed at block 1901.

Returning to FIG. 19, at block 1903, process 1900 involves identifying, in the syntactic tree, a first entity and a second entity. Autonomous agent 119 identifies, from the syntactic tree, a list of entities. From the list of entities, autonomous agent 119 identifies pairs of entities and attempts to determine that each entity in the pair are opposite each other.

Different approaches can be used to identify entities. For instance, autonomous agent 119 can create an ontology such as entity database 122. The entity database 122 can include entries, each entry including a noun (e.g., man) and one or more synonyms of the noun (e.g., dude, grown man). Autonomous agent 119 identifies in the ontology, a particular entry that includes a synonym that matches the first entity. Then, autonomous agent 119 substitutes the noun of the particular entry as the first entity.

In an example, search engine-based techniques can be used to expand entity database 122. Autonomous agent 119 provides a query to a search engine and receives, from the search engine, an additional entity that is a synonym of the entity. Autonomous agent 119 adds the additional entity to a synonym in the respective entry, thereby increasing the coverage of the entity database 122.

Returning to FIG. 19, at block 1904, process 1900 involves determining that the first entity is opposite to the second entity.

A baseline approach here can use distributional semantics (e.g., representing words as vectors such as via word2vec). A pair of prominent entities in 'Say and Do' or 'Say One thing then Say Another thing' should be coordinated. Various different approaches can be used to identify whether entities are opposites.

For instance, one or more of the syntactic tree, first entity, and second entity can be provided to a classification model. Based on the training of the classification model, the classification model outputs an indication of whether the first entity is opposite the second entity.

In another example, templates can be used. As shown below, various syntactic templates are shown. An entailment template refers to a deduction or implication. For instance, an example of an entailment template is when a premise implies a hypothesis. By contrast, contradiction templates contrast entities.

Syntactic templates can be matched against text to determine whether a particular entity is opposite another entity.

latter one. But "attraction to other men" and "anti-gay organization" are opposite entities. Once this is determined, a hypocrisy can be identified. Hence we conclude that if |Say & Do|<<|Say & ¬Do|⇒Do≈¬Say is a hypocrisy.

A web thesaurus can be leveraged when a prominent entity is a single word. A web resource can be accessed online or be pre-loaded. Notice that the accuracy of word meanings significantly exceeds that of compositional semantic models. To coordinate prosperous and homeless, we need to get a list of synonyms and antonyms for each and then attempt to find a common word. If this attempt is unsuccessful, a vector representation of words can be used to link derived synonyms and/or antonyms to produce a chain of words connecting the prominent entities. Web ontologies are usually horizontal and domain-independent. A domain-specific ontology of entities can be employed as well, but its construction is costly.

At block 1905, process 1900 involves determining a first sentiment score for a first fragment including the first entity and a second sentiment score for a second fragment including the second entity. Determining an indication of sentiment on an individual phrase level is most informative about a dialogue. A sentiment score or profile shows how an instant sentiment value changes with each utterance, and

TABLE 3

Syntactic templates for entailment and contradiction

| Entailment templates | Contradiction templates |
|---|---|
| "\<premise\> implies \<hypothesis\>" | "In sentence 1 \<premise\> while in sentence 2 \<hypothesis\>" |
| "If \<premise\> then \<hypothesis\>" | "It can either be \<premise\> or \<hypothesis\>" |
| "\<premise\> would imply \<hypothesis\>" | "It cannot be \<hypothesis\> if \<premise\>" |
| "\<hypothesis\> is a rephrasing of \<premise\>" | "Either \<premise\> or \<hypothesis\>" |
| "\<premise\> is a rephrasing of \<hypothesis\>" | "Either \<hypothesis\> or \<premise\>" |
| "In both sentences \<hypothesis\>" | "\<premise\> and other \<hypothesis\>" |
| "\<premise\> would be \<hypothesis\>" | "\<hypothesis\> and other \<premise\>" |
| "\<premise\> can also be said as \<hypothesis\>" | "\<hypothesis\> after \<premise\>" |
| "\<hypothesis\> can also be said as \<premise\>" | "\<premise\> is not the same as \<hypothesis\>" |
| "\<hypothesis\> is a less specific rephrasing of \<premise\>" | "\<hypothesis\> is not the same as \<premise\>" |
| "This clarifies that \<hypothesis\>" | "\<premise\> is contradictory to \<hypothesis\>" |
| "If \<premise\> it means \<hypothesis\>" | "\<hypothesis\> is contradictory to \<premise\>" |
| "\<hypothesis\> in both sentences" | "\<premise\> contradicts \<hypothesis\>" |
| "\<hypothesis\> in both" | "\<hypothesis\> contradicts \<premise\>" |
| "\<hypothesis\> is same as \<premise\>" | "\<premise\> cannot also be \<hypothesis\>" |
| "\<premise\> is same as \<hypothesis\>" | "\<hypothesis\> cannot also be \<premise\>" |
| "\<premise\> is a synonym of \<hypothesis\>" | "either \<premise\> or \<hypothesis\>" |
| "\<hypothesis\> is a synonym of \<premise\>". | "either \<premise\> or \<hypothesis\> not both at the same time" |
| | "\<premise\> or \<hypothesis\> not both at the same time". |

In some cases, the internet can be used to explore how two entities are inter-related (or, in particular, contrasting). For instance, the internet can be used to determine whether two prominent entities are opposite to each other or not. In an example, the text 'attraction to other men' and 'anti-gay organization' are selected. A reversal of meaning for a prominent entity can dramatically boost affinity.

In some cases, determining opposite entities uses web mining. In this case, web mining results include seven search results associating "attraction to other men" vs "anti-gay organization" and 1810 search results for the same prominent entities but with the reversal of meaning for the how a dialogue participant abruptly changes his attitude, values and estimates of the dialogue participants.

A sentiment score indicates an emotion indicated by the respective entity. Emotion in conversation can be a useful indicator. Conversations are rich with emotions that, with a suitable computing system, can be analyzed. People communicate with others to exchange information and improve social bonding. To exchange and share ideas, people frequently communicate with others using certain dialog flow patterns. Usually, humans do not rigidly answer questions of others and instead wait for the next question. By contrast, conversation participants may first respond to previous context and only then propose their own questions and suggestions. In this way, people show their attention to the words of others and confirm that they are willing to continue the conversation. Daily conversations are rich in emotion. By expressing emotions, people show their mutual respect, empathy and understanding to each other, and thus improve the relationships. Determining the emotional content of utterances can use communicative discourse trees and/or keyword analysis.

As such, each sentiment score indicates an emotion indicated by the respective fragment. For example, a sentiment score can be on a scale that ranges from negative emotion (e.g., angry, upset) to positive emotion (e.g., happy, elated). In a further example, the sentiment scale is a numerical scale that is from −1 (negative) to +1 (positive).

Different methods can be used to determine a sentiment score. In a keyword-based approach, autonomous agent 114 analyzes the first utterance and the second utterance separately. Autonomous agent 114 identifies, in each utterance, any keywords that indicate sentiment. Examples of such keywords include bad, good, adequate, adjustable, admirable, adorable, regret, indifferent, disappointed, doubts, outmaneuvered. Each keyword can have an associated sentiment score (for example, on a scale from negative to positive). Autonomous agent 114 determines, for each utterance, a sentiment score of the keywords in the utterance. In some cases, statistical metrics can be used such as median, mean, or mode of the keyword scores.

Continuing the above example, autonomous agent 114 determines a sentiment score for the first fragment and the second fragment. In this example, autonomous agent 114 determines a sentiment score of 0 for the first utterance and −0.6 for the second utterance.

Figure 21:
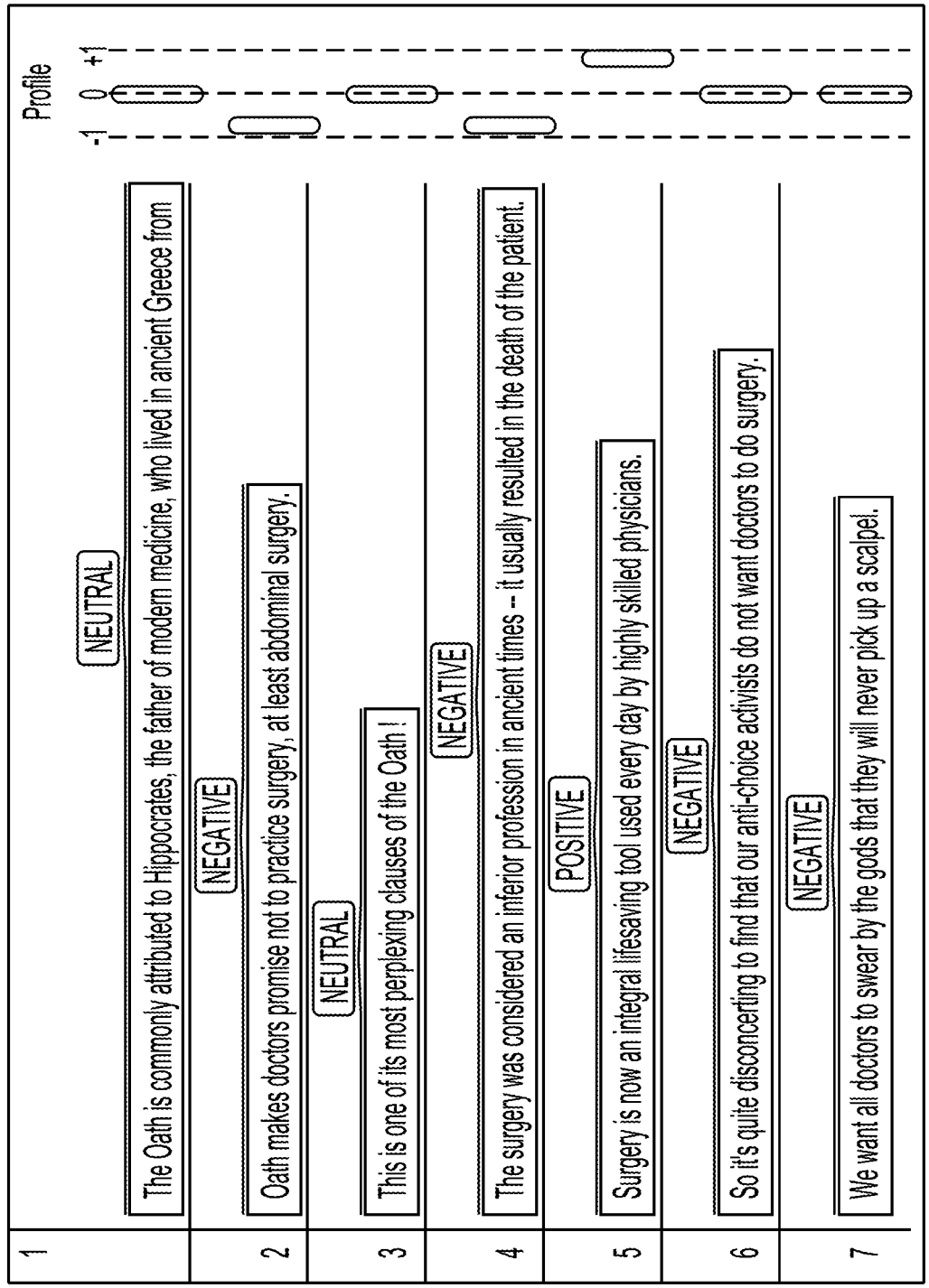
FIG. 21 illustrates an exemplary sentiment profile, in accordance with an aspect.

FIG. 21 illustrates an exemplary sentiment profile, in accordance with an aspect. FIG. 21 depicts sentiment profile 2100. As can be seen, sentiment profile 2100 includes an indication of a sentiment score for the text "The Oath is commonly attributed to . . . "). An indication of sentiment as determined by an individual phrase is informative about the dialogue. The sentiment profile shows how an instant sentiment value changes with each utterance, and how a dialogue participant abruptly changes his attitude, values and estimates of the dialogue participants.

Sentiment profile 2100 shows a sentiment score for each of the six sentences in the text. The score ranges from negative (e.g., −1) to positive (e.g., +1). The sentiment profile starts with neutral territory as a speaker introduces background information. The it switches to negative as pro-choice proponent expresses her opinion, and back to neutral. At some point in the middle of the conversation it jumps to positive, and then descends to two utterance in the negative territory.

In an aspect, a machine-learning based approach can be used for sentiment detection. For example, autonomous agent 114 can create a communicative discourse tree from the fragments. An example of a process for creating a communicative discourse tree is shown in FIG. 15 and accompanying text.

Autonomous agent 114 creates a first communicative discourse tree for the first fragment and a second communicative discourse tree for the second fragment. The communicative discourse trees are provided to a trained machine-learning model such as classification model 112. In turn, classification model 112 outputs a score indicative of the sentiment of the text. As discussed previously, a sentiment score can range from −1 (negative) to 1 (positive).

Continuing the example, a CDT for the dialogue is shown as:

```
elaboration
  elaboration
    TEXT:The Oath is commonly attributed to Hippocrates , the father of modern medicine ,
    TEXT:who lived in ancient Greece from about 460 to 370 BC .
  elaboration
    TEXT:Oath makes doctors promise not to practice surgery, at least abdominal surgery .
    elaboration
      TEXT:This is one of its most perplexing clauses of the Oath !
      elaboration
        elaboration
          TEXT:The surgery was considered an inferior profession in ancient times -
          result
            TEXT:- it usually resulted
            TEXT: in the death of the patient .
        elaboration
          elaboration
            TEXT:Surgery is now an integral lifesaving tool
            TEXT:used every day by highly skilled physicians .
          attribution
            TEXT:So it 's quite disconcerting to find
            enablement
              TEXT:that our anti-choice activists want all doctors
              elaboration
                TEXT:to swear by the gods
                TEXT:that they will never pick up a scalpel .
```

The classification model 112 is previously trained to identify emotions based on input communicative discourse trees for which emotion associations are known. For instance, suitable training data includes segments of text that are verified to represent a positive or negative emotion (or any variant thereof) is provided iteratively to classification model 112. In turn, classification model 112 learns to predict sentiment from text.

Returning to FIG. 19, at block 1906, process 1600 involves responsive to determining that the first sentiment score and the second sentiment score indicate opposite emotions, identifying the text as comprising hypocrisy and providing the text to an external device. As discussed above, a sentiment profile can be used to determine opposites. For instance, one fragment of text with a sentiment profile of −1 is opposite a fragment of text with a sentiment profile of 1.

Using Machine Learning to Detect Hypocrisy

Nearest-neighbor-based and SVM Tree Kernel learning, oriented to tackle structured tree-like features. Nearest-neighbor Learning is used for faster detection with explainability. Once/if a nearest neighbor template is found, the hypocrisy detector explains its decision for why a given text is classified as hypocrisy or not. As a candidate neighbor is found, the system attempts to coordinate the entities in Say and Do parts. The detector performs generalization of a current text and a candidate nearest template only if coordination of prominent entities succeeds.

SVM TK learning is used for iterative improvement of detection accuracy by enlarging the training set. SVM TK does not possess the explainability feature and speed performance of the nearest-neighbor but assures a higher detection accuracy. It employs the same entity coordination component.

In an example, computing device 110 uses classification model 112 and training data 120 to train one or more models to detect hypocrisy. In an example process, computing device 110 accesses text and creates, from fragments of the text a syntactic tree that represents syntactic relationships between words in the fragments and a discourse tree that represents rhetorical relationships between words in the fragments. Computing device 110 provides the syntactic tree and the discourse tree to a nearest neighbor classification model or a SVM Tree Kernel model. Computing device 110 receives, from the model, a score indicating a presence of hypocrisy in the text. The score can indicate a likelihood or probability of the presence of hypocrisy. If the score is greater than a threshold, then computing device 110 can take action such as taking a decision or outputting one or more fragments of the text.

To achieve the higher accuracy detection, given the available raw training dataset, and minimize manual tagging, a golden (reduced) set of accepted texts containing hypocrisy is iteratively expanded. We first apply the initial set of manually built templates to the raw set of texts and obtain the current reduced set. Then we use SVM TK for building a classification model from this reduced set. Once this classification model is built, it is applied to the raw set and is supposed to produce a larger reduced training set. This larger reduced set is expected to produce a better model. The iterations continue until the model stops to improve. It could be measured as a gain of F1 at the latest iteration below 0.3%.

The following flow shows how starting from the initial set of manually formed sentences with hypocrisy and a set of templates for hypocrisy, one can iteratively build a substantially larger positive training set (a negative training set of sentences without hypocrisy can be easily grown from arbitrary sentences).
(1) Apply the current set of templates
(2) Obtained current extended positive set
(3) Train the model using this current extended positive set
(4) Apply this model to the whole set of sentences which can express hypocrisy
(5) Obtain the larger set of positively classified sentences As we apply templates to a corpus where sentences with hypocrisy are expected to occur (such as tweets not explicitly tagged as hypocritical), we automatically identify new members of the positive training set. Once we build a classification model, we can apply it and find more such sentences with hypocrisy. As we have a larger positive set, we retrain the classification model and grow the positive set even further (on the bottom-left).

Once we learn to recognize sentences with explicit hypocrisy, where both saying and doing parts are present, we envision a future exploration of the texts with implicit reference to hypocrisy where the saying part is inferred (assumed) and only doing part is present, usually associated with negative sentiment and emotionally charged.

Because expressions with hypocrisy are so peculiar subject of study in NLP, we do not follow a traditional ML methodology. We use a combined manual and automatic method to construct the training dataset, reducing the large original one obtained from various sources. As we construct it and use for learning, we obtain detection test results and as long F1 is improving, we apply the trained model to the original set attempting to form a larger training set. Hence the entire hypocrisy detection dataset formation procedure is iterative.

Evaluation

We collect Say-Do sentences and paragraphs from multiple sources on the web related to hypocrisy. Twitter Search API can be used to obtain tweets with hashtags related to hypocrisy. Additional datasets were used. The negative dataset for the web source was obtained from the same sites for items other than hypocrisy. For tweets, the replies to the posts associated with hypocrisy are used so that have the texts on the same topic but without the Say-Do hypocrisy part are present. For the complaint dataset, sentences with positive reviews are used as text without hypocrisy. A two-step learning to minimize a manual tagging of texts perceived by a human annotator as hypocritical is used. In the first step, templates to build a gold set of "genuine" expressions for hypocrisy are used. A manual spot-check is used to confirm the precision of the training data. The first step is performed iteratively adjusting the templates. On the second step, a classifier is trained in a traditional setting, exploring accuracy of Nearest Neighbor and SVM TK.

TABLE 4

Positive training sets

| Source of Hypocritical expressions | # in original set | # in selected set | Average # of sentences | Average # of words |
|---|---|---|---|---|
| Expression from web sources | 280 | 213 | 1.7 | 18.2 |
| Expressions from twitter tagged #Hypocrite | 4217 | 516 | 1.4 | 16.7 |
| Expressions from twitter tagged #Double-standard | 2319 | 308 | 1.5 | 17.6 |
| Expressions from twitter tagged #hypocrisyatitsfinest | 565 | 159 | 1.4 | 17.0 |
| Customer complaint recognized as valid | 1328 | 265 | 7.3 | 76.3 |
| Random customer complaint | 1400 | 188 | 8.5 | 81.4 |

Contention Between "Say" and "Do"

A contention rate between Say and Do can be defined quantitatively as a probability that two people, randomly selected from the population, will hold conflicting opinions between what they say. In a plot of controversy rate C, the following axes can be used:
X-axis: probability (C|Total_US, T);
Y-axis: probability (C|Group_of_Computer_Scientists, T).

Let $\Omega = \{p_1 \ldots, p_n\}$ be a population of n people, and T is a topic of interest. Let c denote the degree of contention, which we also define with respect to a topic and a group of people: $P(c|\Omega, T)$ represents the probability of contention of topic T within $\Omega$. Let $P(\neg c|\Omega, T)$ similarly denote the probability of non-contention with respect to a topic and a group of people, such that: $P(c|\Omega, T)+P(\neg c|\Omega, T)=1$.

Let s denote a stance with regard to the topic T, and let the relationship holds(p, s, T) denote that person p holds stance s with regard to topic T. Let $S^{\wedge}=\{s_1, s_2, \ldots, s_k\}$ be the set of k stances with regard to topic T in the population O. We allow people to hold no stance at all with regard to the topic (either because they are not aware of the topic, or they are aware of it but do not take a stance on it). We use so to represent this lack of stance. In that case, we define holds(p, $s_0$, T)$\Leftrightarrow \neg \exists s_i \in S^{\wedge}$ such that holds(p, $s_i$, T)

Let $S=\{s_0\} \cup S^{\wedge}$ be the set of k+1 stances with regard to topic T in the population $\Omega$. Therefore, $\forall p \in \Omega$, $\exists s \in S$ such that holds(p, s, T). Now, let conflicts: $S \times S \to \{0, 1\}$ be a binary function which represents when two stances are in conflict. Note that a person can hold multiple stances simultaneously, though no stance can be jointly held with so. We set conflicts($s_i$, $s_i$)=0.

Let stance groups in the population be groups of people that hold the same stance: for $i \in \{0 \ldots k\}$, let $G_i=\{p \in \Omega | \text{holds}(p, s_i, T)\}$. By construction, $\Omega = \cup_i G_i$. Let opposing groups in the population be groups of people that hold a stance that conflicts with $s_i$. For $i \in \{0 \ldots k\}$, let $O_i=\{p \in \Omega | \exists j \text{ such that holds}(p, s_j, T) \wedge \text{conflicts}(s_i, s_j)\}$.

We intend to quantify a proportion of people where Say and Do parts disagree. This proportion of people should grow when the groups in disagreement are larger. We estimate the probability that two randomly selected people hold conflicting stances. A contention is modeled directly to do that.

Let $P(c|\Omega, T)$ be the probability that if we randomly select two people in $\Omega$, they will conflict on topic T. This is equal to:

$P(c|\Omega, T)=P(p_1, p_2)$ (selected randomly from $\Omega$),
$\exists s_i, s_j \in S$, s.t. holds($p_1, s_i$, T) $\wedge$ holds($p_2, s_j$, T) $\wedge$ conflicts($s_i, s_j$))

This model simulates a person to hold two conflicting stances at once and thus be in both $G_i$ and $O_i$, as in the case of intrapersonal conflict. This definition, while exhaustive to all possible combinations of stances, is very hard to estimate. We now consider a special case of this model with two additional constraints. Let every person have only one stance on a topic:

$\neg \exists p \in \Omega$, $s_i, s_j \in S$ such that $i \neq j \wedge$ holds(p, $s_i$, T) $\wedge$ holds(p, $s_j$, T).

And, let every explicit stance conflict with every other explicit stance:

conflicts($s_i, s_j$)$\Leftarrow \Rightarrow (i \neq j \wedge i \neq 0 \wedge j \neq 0)$ This implies that $G_i \cap G_j = \emptyset$. We enforce a lack of stance not to be in conflict with any explicit stance. Thus, $O_i = \Omega \backslash G_i \backslash G_0$ as a set-theoretic subtraction.

For simplicity, we estimate the probability of selecting $p_1$ and $p_2$ as selection with replacement. Note that $|\Omega|=\Sigma_{i \in \{0 \ldots k\}}|G_i|$ and the probability of choosing any particular pair is $1/|\Omega|^2$. $|\Omega|$ is in turn equals to $$|\Omega|^2 = \left(\sum_i |G_i|\right)^2 = \sum_{i \in \{0 \ldots k\}} |G_i|^2 + \sum_{i \in \{1 \ldots k\}} (2|G_0||G_i|) + \sum_{i \in \{2 \ldots k\}} \sum_{j \in \{1 \ldots i-1\}} (2|G_i||G_j|)$$

Depending on whether the pair of people selected hold conflicting stances or not, they contribute to the numerator in $P(c|\Omega, T)$ or $P(\neg c|\Omega, T)$, respectively. Finally, we obtain $$P(c|\Omega, T) = \frac{\sum_{i \in \{2 \ldots k\}} \sum_{j \in \{1 \ldots i-1\}} (2|G_i||G_j|)}{|\Omega|^2} \text{ and}$$

$$P(nc|\Omega, T) = 1 - P(c|\Omega, T) = \frac{\sum_{i \in \{0 \ldots k\}} |G_i|^2 + \sum_{i \in \{1 \ldots k\}} (2|G_0||G_i|)}{|\Omega|^2}$$

Exemplary Computing Systems

Figure 22:
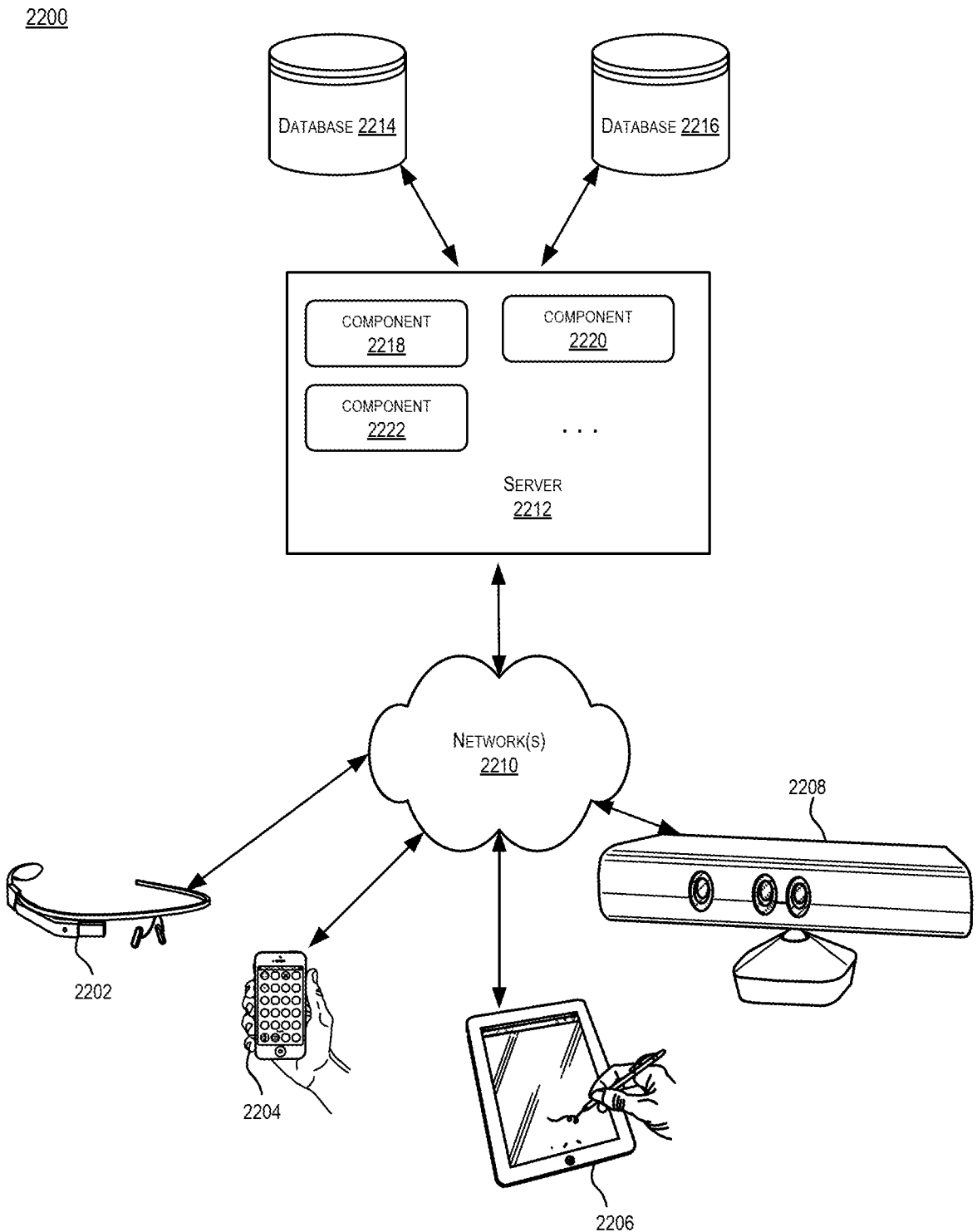
FIG. 22 depicts a simplified diagram of a distributed system for implementing one of the aspects.

FIG. 22 depicts a simplified diagram of a distributed system 2200 for implementing one of the aspects. In the illustrated aspect, distributed system 2200 includes one or more client computing devices 2202, 2204, 2206, and 2208, which are configured to execute and operate a client application such as a web browser, proprietary client (e.g., Oracle Forms), or the like over one or more network(s) 2210. Server 2212 may be communicatively coupled with remote client computing devices 2202, 2204, 2206, and 2208 via network 2210.

In various aspects, server 2212 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 2202, 2204, 2206, and/or 2208. Users operating client computing devices 2202, 2204, 2206, and/or 2208 may in turn utilize one or more client applications to interact with server 2212 to utilize the services provided by these components.

In the configuration depicted in the figure, the software components 2218, 2220 and 2222 of system 2200 are shown as being implemented on server 2212. In other aspects, one or more of the components of distributed system 2200 and/or the services provided by these components may also be implemented by one or more of the client computing devices 2202, 2204, 2206, and/or 2208. Users operating the client computing devices may then utilize one or more client applications to use the services provided by these components. These components may be implemented in hardware, firmware, software, or combinations thereof. It should be appreciated that various different system configurations are possible, which may be different from distributed system 2200. The aspect shown in the figure is thus one example of a distributed system for implementing an aspect system and is not intended to be limiting.

Client computing devices 2202, 2204, 2206, and/or 2208 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including, without limitation, the variety of GNU/Linux operating systems, such as for example, Google Chrome OS. Alternatively, or in addition, client computing devices 2202, 2204, 2206, and 2208 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2210.

Although exemplary distributed system 2200 is shown with four client computing devices, any number of client computing devices may be supported. Other devices, such as devices with sensors, etc., may interact with server 2212.

Network(s) 2210 in distributed system 2200 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 2210 can be a local area network (LAN), such as one based on Ethernet, Token-Ring and/or the like. Network(s) 2210 can be a wide-area network and the Internet. It can include a virtual network, including, without limitation, a virtual private network (VPN), an intranet, an extranet, a public switched telephone network (PSTN), an infra-red network, a wireless network (e.g., a network operating under any of the Institute of Electrical and Electronics (IEEE) 802.22 suite of protocols, Bluetooth®, and/or any other wireless protocol); and/or any combination of these and/or other networks.

Server 2212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2212 can include one or more virtual machines running virtual operating systems, or other computing architectures involving virtualization. One or more flexible pools of logical storage devices can be virtualized to maintain virtual storage devices for the server. Virtual networks can be controlled by server 2212 using software defined networking. In various aspects, server 2212 may be adapted to run one or more services or software applications described in the foregoing disclosure. For example, server 2212 may correspond to a server for performing processing described above according to an aspect of the present disclosure.

Server 2212 may run an operating system including any of those discussed above, as well as any commercially available server operating system. Server 2212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 2212 may include one or more applications to analyze and consolidate data feeds and/or event updates received from users of client computing devices 2202, 2204, 2206, and 2208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2212 may also include one or more applications to display the data feeds and/or real-time events via one or more display devices of client computing devices 2202, 2204, 2206, and 2208.

Distributed system 2200 may also include one or more databases 2214 and 2216. Databases 2214 and 2216 may reside in a variety of locations. By way of example, one or more of databases 2214 and 2216 may reside on a non-transitory storage medium local to (and/or resident in) server 2212. Alternatively, databases 2214 and 2216 may be remote from server 2212 and in communication with server 2212 via a network-based or dedicated connection. In one set of aspects, databases 2214 and 2216 may reside in a storage-area network (SAN). Similarly, any necessary files for performing the functions attributed to server 2212 may be stored locally on server 2212 and/or remotely, as appropriate. In one set of aspects, databases 2214 and 2216 may include relational databases, such as databases provided by Oracle, that are adapted to store, update, and retrieve data in response to SQL-formatted commands.

Figure 23:
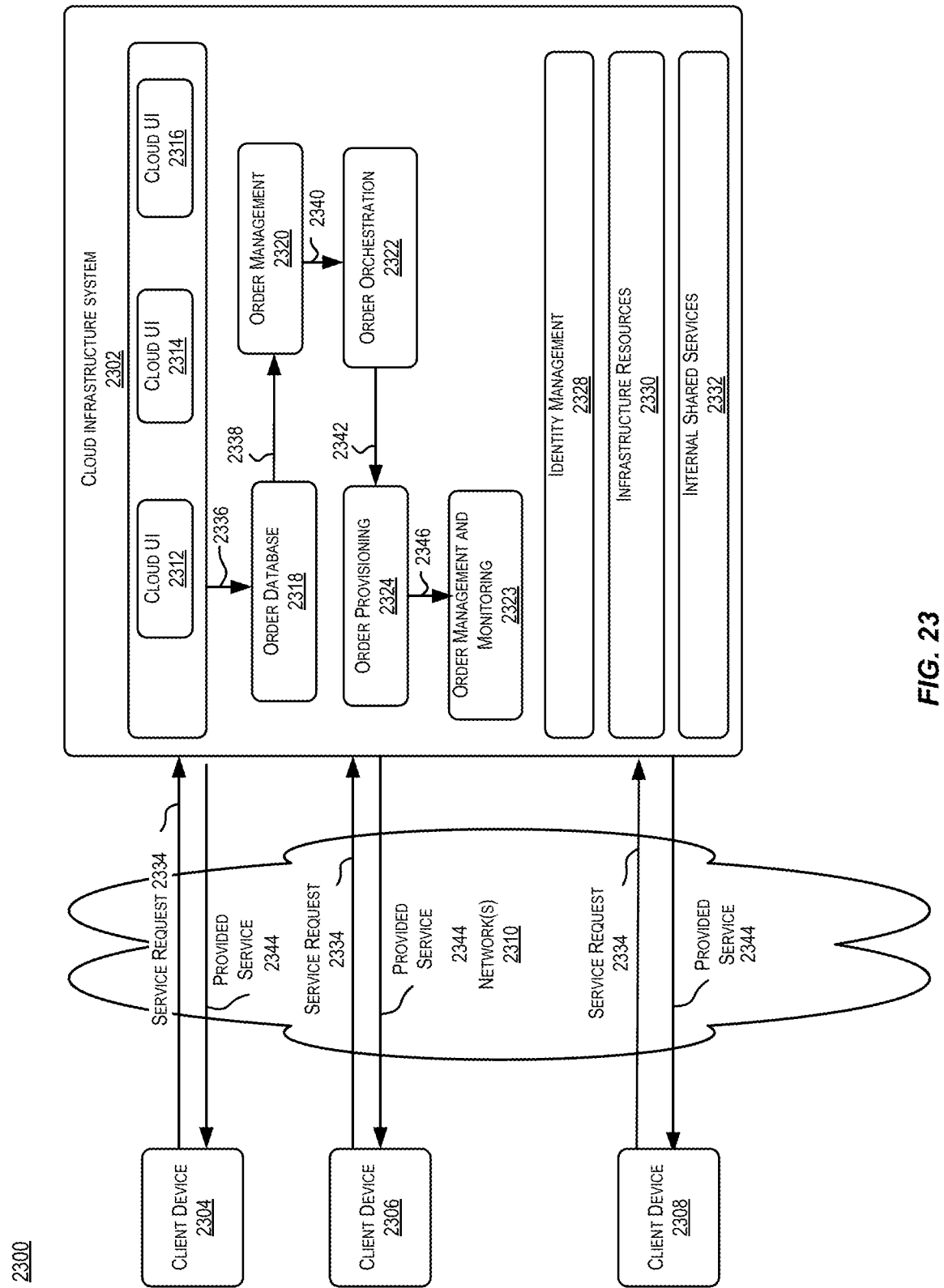
FIG. 23 is a simplified block diagram of components of a system environment by which services provided by the components of an aspect system may be offered as cloud services in accordance with an aspect.

FIG. 23 is a simplified block diagram of one or more components of a system environment 2300 by which services provided by one or more components of an aspect system may be offered as cloud services, in accordance with an aspect of the present disclosure. In the illustrated aspect, system environment 2300 includes one or more client computing devices 2304, 2306, and 2308 that may be used by users to interact with a cloud infrastructure system 2302 that provides cloud services. The client computing devices may be configured to operate a client application such as a web browser, a proprietary client application (e.g., Oracle Forms), or some other application, which may be used by a user of the client computing device to interact with cloud infrastructure system 2302 to use services provided by cloud infrastructure system 2302.

It should be appreciated that cloud infrastructure system 2302 depicted in the figure may have other components than those depicted. Further, the aspect shown in the figure is only one example of a cloud infrastructure system that may incorporate an aspect of the invention. In some other aspects, cloud infrastructure system 2302 may have more or fewer components than shown in the figure, may combine two or more components, or may have a different configuration or arrangement of components.

Client computing devices 2304, 2306, and 2308 may be devices similar to those described above for client computing devices 2202, 2204, 2206, and 2208.

Although exemplary system environment 2300 is shown with three client computing devices, any number of client computing devices may be supported. Other devices such as devices with sensors, etc. may interact with cloud infrastructure system 2302.

Network(s) 2310 may facilitate communications and exchange of data between clients computing devices 2304, 2306, and 2308 and cloud infrastructure system 2302. Each network may be any type of network familiar to those skilled in the art that can support data communications using any of a variety of commercially-available protocols, including those described above for network(s) 2210.

Cloud infrastructure system 2302 may comprise one or more computers and/or servers that may include those described above for server 2212.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 2302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 2302 may be adapted to automatically provision, manage and track a customer's subscription to services offered by cloud infrastructure system 2302. Cloud infrastructure system 2302 may provide the cloud services via different deployment models. For example, services may be provided under a public cloud model in which cloud infrastructure system 2302 is owned by an organization selling cloud services (e.g., owned by Oracle) and the services are made available to the general public or different industry enterprises. As another example, services may be provided under a private cloud model in which cloud infrastructure system 2302 is operated solely for a single organization and may provide services for one or more entities within the organization. The cloud services may also be provided under a community cloud model in which cloud infrastructure system 2302 and the services provided by cloud infrastructure system 2302 are shared by several organizations in a related community. The cloud services may also be provided under a hybrid cloud model, which is a combination of two or more different models.

In some aspects, the services provided by cloud infrastructure system 2302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2302. Cloud infrastructure system 2302 then performs processing to provide the services in the customer's subscription order.

In some aspects, the services provided by cloud infrastructure system 2302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 2302 may also include infrastructure resources 2330 for providing the resources used to provide various services to customers of the cloud infrastructure system. In one aspect, infrastructure resources 2330 may include pre-integrated and optimized combinations of hardware, such as servers, storage, and networking resources to execute the services provided by the PaaS platform and the SaaS platform.

In some aspects, resources in cloud infrastructure system 2302 may be shared by multiple users and dynamically re-allocated per demand. Additionally, resources may be allocated to users in different time zones. For example, cloud infrastructure system 2302 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 2332 may be provided that are shared by different components or modules of cloud infrastructure system 2302 and by the services provided by cloud infrastructure system 2302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 2302 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 2302, and the like.

In one aspect, as depicted in the figure, cloud management functionality may be provided by one or more modules, such as an order management module 2320, an order orchestration module 2322, an order provisioning module 2324, an order management and monitoring module 2323, and an identity management module 2328. These modules may include or be provided using one or more computers and/or servers, which may be general purpose computers, specialized server computers, server farms, server clusters, or any other appropriate arrangement and/or combination.

In exemplary operation 2334, a customer using a client device, such as client computing device 2304, 2306 or 2308, may interact with cloud infrastructure system 2302 by requesting one or more services provided by cloud infrastructure system 2302 and placing an order for a subscription for one or more services offered by cloud infrastructure system 2302. In certain aspects, the customer may access a cloud User Interface (UI), cloud UI 2312, cloud UI 2314 and/or cloud UI 2316 and place a subscription order via these UIs. The order information received by cloud infrastructure system 2302 in response to the customer placing an order may include information identifying the customer and one or more services offered by the cloud infrastructure system 2302 in which the customer intends to subscribe.

After an order has been placed by the customer, the order information is received via the cloud UIs, 2323, 2314 and/or 2316.

At operation 2336, the order is stored in order database 2318. Order database 2318 can be one of several databases operated by cloud infrastructure system 2302 and operated in conjunction with other system elements.

At operation 2338, the order information is forwarded to an order management module 2320. In some instances, order management module 2320 may be configured to perform billing and accounting functions related to the order, such as verifying the order, and upon verification, booking the order.

At operation 2340, information regarding the order is communicated to an order orchestration module 2322. Order orchestration module 2322 may utilize the order information to orchestrate the provisioning of services and resources for the order placed by the customer. In some instances, order orchestration module 2322 may orchestrate the provisioning of resources to support the subscribed services using the services of order provisioning module 2324.

In certain aspects, order orchestration module 2322 enables the management of business processes associated with each order and applies business logic to determine whether an order should proceed to provisioning. At operation 2342, upon receiving an order for a new subscription, order orchestration module 2322 sends a request to order provisioning module 2324 to allocate resources and configure those resources needed to fulfill the subscription order. Order provisioning module 2324 enables the allocation of resources for the services ordered by the customer. Order provisioning module 2324 provides a level of abstraction between the cloud services provided by cloud infrastructure system 2302 and the physical implementation layer that is used to provision the resources for providing the requested services. Order orchestration module 2322 may thus be isolated from implementation details, such as whether or not services and resources are actually provisioned on the fly or pre-provisioned and only allocated/assigned upon request.

At operation 2344, once the services and resources are provisioned, a notification of the provided service may be sent to customers on client computing devices 2304, 2306 and/or 2308 by order provisioning module 2324 of cloud infrastructure system 2302.

At operation 2346, the customer's subscription order may be managed and tracked by an order management and monitoring module 2323. In some instances, order management and monitoring module 2323 may be configured to collect usage statistics for the services in the subscription order, such as the amount of storage used, the amount data transferred, the number of users, and the amount of system up time and system down time.

In certain aspects, cloud infrastructure system 2302 may include an identity management module 2328. Identity management module 2328 may be configured to provide identity services, such as access management and authorization services in cloud infrastructure system 2302. In some aspects, identity management module 2328 may control information about customers who wish to utilize the services provided by cloud infrastructure system 2302. Such information can include information that authenticates the identities of such customers and information that describes which actions those customers are authorized to perform relative to various system resources (e.g., files, directories, applications, communication ports, memory segments, etc.). Identity management module 2328 may also include the management of descriptive information about each customer and about how and by whom that descriptive information can be accessed and modified.

Figure 24:
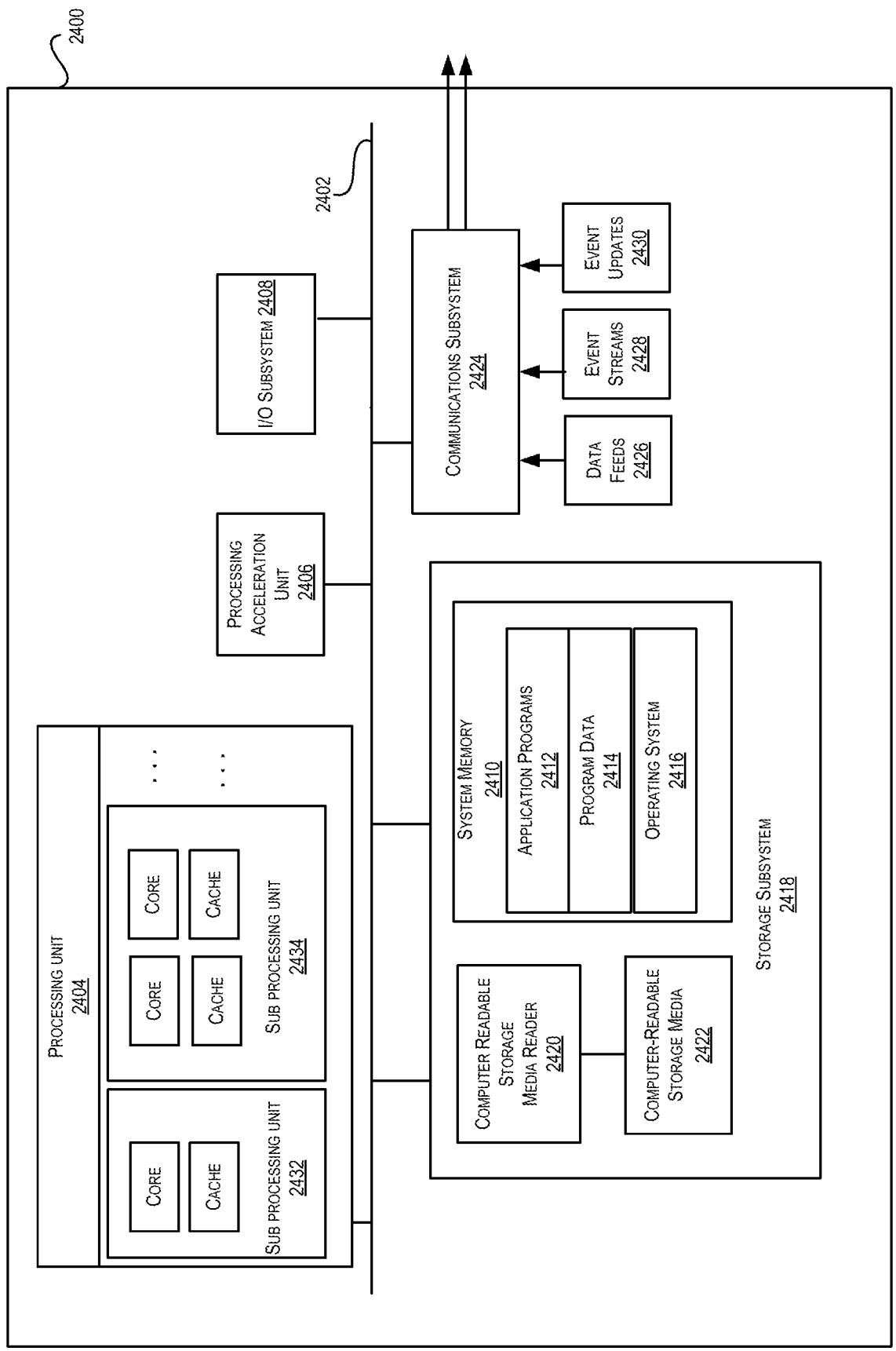
FIG. 24 illustrates an exemplary computing subsystem, in which various aspects of the present invention may be implemented.

FIG. 24 illustrates an exemplary computing subsystem 2400, in which various aspects of the present invention may be implemented. The computing subsystem 2400 may be used to implement any of the computing subsystems described above. As shown in the figure, computing subsystem 2400 includes a processing unit 2404 that communicates with a number of peripheral subsystems via a bus subsystem 2402. These peripheral subsystems may include a processing acceleration unit 2406, an I/O subsystem 2408, a storage subsystem 2418 and a communications subsystem 2424. Storage subsystem 2418 includes tangible computer-readable storage media 2422 and a system memory 2410.

Bus subsystem 2402 provides a mechanism for letting the various components and subsystems of computing subsystem 2400 communicate with each other as intended. Although bus subsystem 2402 is shown schematically as a single bus, alternative aspects of the bus subsystem may utilize multiple buses. Bus subsystem 2402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P2486.1 standard.

Processing unit 2404, which can be implemented as one or more integrated circuits (e.g., a conventional microprocessor or microcontroller), controls the operation of computing subsystem 2400. One or more processors may be included in processing unit 2404. These processors may include single-core or multicore processors. In certain aspects, processing unit 2404 may be implemented as one or more independent processing units 2432 and/or 2434 with single or multicore processors included in each processing unit. In other aspects, processing unit 2404 may also be implemented as a quad-core processing unit formed by integrating two dual-core processors into a single chip.

In various aspects, processing unit 2404 can execute a variety of programs in response to program code and can maintain multiple concurrently executing programs or processes. At any given time, some or all of the program code to be executed can be resident in processor(s) 2404 and/or in storage subsystem 2418. Through suitable programming, processor(s) 2404 can provide various functionalities described above. Computing subsystem 2400 may additionally include a processing acceleration unit 2406, which can include a digital signal processor (DSP), a special-purpose processor, and/or the like.

I/O subsystem 2408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing subsystem 2400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computing subsystem 2400 may comprise a storage subsystem 2418 that comprises software elements, shown as being currently located within a system memory 2410. System memory 2410 may store program instructions that are loadable and executable on processing unit 2404, as well as data generated during the execution of these programs.

Depending on the configuration and type of computing subsystem 2400, system memory 2410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2404. In some implementations, system memory 2410 may include multiple different types of memory, such as static random access memory (SRAM) or dynamic random access memory (DRAM). In some implementations, a basic input/output system (BIOS), containing the basic routines that help to transfer information between elements within computing subsystem 2400, such as during start-up, may typically be stored in the ROM. By way of example, and not limitation, system memory 2410 also illustrates application programs 2412, which may include client applications, Web browsers, mid-tier applications, relational database management systems (RDBMS), etc., program data 2414, and an operating system 2416. By way of example, operating system 2416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2418 may also provide a tangible computer-readable storage medium for storing the basic programming and data constructs that provide the functionality of some aspects. Software (programs, code modules, instructions) that when executed by a processor, provides the functionality described above and may be stored in storage subsystem 2418. These software modules or instructions may be executed by processing unit 2404. Storage subsystem 2418 may also provide a repository for storing data used in accordance with the present invention.

Storage subsystem 2418 may also include a computer-readable storage media reader 2420 that can further be connected to computer-readable storage media 2422. Together and, optionally, in combination with system memory 2410, computer-readable storage media 2422 may comprehensively represent remote, local, fixed, and/or removable storage devices plus storage media for temporarily and/or more permanently containing, storing, transmitting, and retrieving computer-readable information.

Computer-readable storage media 2422 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 2400.

By way of example, computer-readable storage media 2422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2422 may include, but is not limited to, Zip® drives, flash memory cards, universal serial bus (USB) flash drives, secure digital (SD) cards, DVD disks, digital video tape, and the like. Computer-readable storage media 2422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computing subsystem 2400.

Communications subsystem 2424 provides an interface to other computing subsystems and networks. Communications subsystem 2424 serves as an interface for receiving data from and transmitting data to other systems from computing subsystem 2400. For example, communications subsystem 2424 may enable computing subsystem 2400 to connect to one or more devices via the Internet. In some aspects, communications subsystem 2424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.22 family standards, or other mobile communication technologies, or any combination thereof), global positioning system (GPS) receiver components, and/or other components. In some aspects, communications subsystem 2424 can provide wired network connectivity (e.g., Ethernet) in addition to or instead of a wireless interface.

In some aspects, communications subsystem 2424 may also receive input communication in the form of structured and/or unstructured data feeds 2426, event streams 2428, event updates 2430, and the like on behalf of one or more users who may use computing subsystem 2400.

By way of example, communications subsystem 2424 may be configured to receive unstructured data feeds 2426 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 2424 may also be configured to receive data in the form of continuous data streams, which may include event streams 2428 of real-time events and/or event updates 2430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2424 may also be configured to output the structured and/or unstructured data feeds 2426, event streams 2428, event updates 2430, and the like to one or more databases that may be in communication with one or more streaming data source computers coupled to computing subsystem 2400.

Computing subsystem 2400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computing subsystem 2400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method of detecting hypocrisy in text, the method comprising:
    accessing text comprising fragments;
    creating, from the fragments, a syntactic tree that represents syntactic relationships between words in the fragments;
    identifying, in the syntactic tree, a first entity and a second entity;
    determining that the first entity is opposite to the second entity, the determining comprising:
        accessing an ontology that comprises a plurality of entries, wherein each entry of the plurality of entries comprises a noun and one or more synonyms of the noun; and
        responsive to identifying, in the ontology, a particular entry that comprises a synonym matching the first entity, substituting the noun of the particular entry as the first entity;
    determining a first sentiment score for a first fragment comprising the first entity and a second sentiment score for a second fragment comprising the second entity, wherein each sentiment score indicates an emotion indicated by the respective entity, wherein determining the sentiment score for each fragment comprises:
        determining a keyword sentiment score for each keyword of a plurality of keywords in the fragment, wherein the keyword sentiment score indicates whether the keyword signifies positive or negative sentiment;
        determining, from the plurality of keywords, an average keyword sentiment score; and
        identifying the average keyword sentiment score as the sentiment score; and
    responsive to determining that the first sentiment score and the second sentiment score indicate opposite emotions, identifying the text as comprising hypocrisy and providing the text to an external device.

2. The method of claim 1, further comprising, for each entry:
    providing the respective entity to a search engine;
    receiving, from the search engine, an additional entity that is a synonym of the entity; and
    adding the additional entity to a synonym in the respective entry.

3. The method of claim 1, further comprising providing one or more of the first entity and the second entity to the external device.

4. A system comprising:
    a non-transitory computer-readable medium storing computer-executable program instructions; and
    a processing device communicatively coupled to the non-transitory computer-readable medium for executing the computer-executable program instructions, wherein executing the computer-executable program instructions configures the processing device to perform operations comprising:
        accessing text comprising fragments;
        creating, from the fragments, a syntactic tree that represents syntactic relationships between words in the fragments;
        identifying, in the syntactic tree, a first entity and a second entity;
        determining that the first entity is opposite to the second entity, the determining comprising:
            accessing an ontology that comprises a plurality of entries, wherein each entry of the plurality of entries comprises a noun and one or more synonyms of the noun; and
            responsive to identifying, in the ontology, a particular entry that comprises a synonym matching the first entity, substituting the noun of the particular entry as the first entity;
        determining a first sentiment score for a first fragment comprising the first entity and a second sentiment score for a second fragment comprising the second entity, wherein each sentiment score indicates an emotion indicated by the respective entity, wherein determining the sentiment score for each fragment comprises:
            determining a keyword sentiment score for each keyword of a plurality of keywords in the fragment, wherein the keyword sentiment score indicates whether the keyword signifies positive or negative sentiment;
            determining, from the plurality of keywords, an average keyword sentiment score; and
            identifying the average keyword sentiment score as the sentiment score; and
        responsive to determining that the first sentiment score and the second sentiment score indicate opposite emotions, identifying the text as comprising hypocrisy and providing the text to an external device.

5. The system of claim 4, wherein the operations further comprise, for each entry:
    providing the respective entity to a search engine;
    receiving, from the search engine, an additional entity that is a synonym of the entity; and
    adding the additional entity to a synonym in the respective entry.

6. The system of claim 4, the operations further comprising providing one or more of the first entity and the second entity to the external device.

7. A non-transitory computer-readable storage medium storing computer-executable program instructions, wherein when executed by a processing device, the program instructions cause the processing device to perform operations comprising:
- accessing text comprising fragments;
- creating, from the fragments, a syntactic tree that represents syntactic relationships between words in the fragments;
- identifying, in the syntactic tree, a first entity and a second entity;
- determining that the first entity is opposite to the second entity, the determining comprising:
  - accessing an ontology that comprises a plurality of entries, wherein each entry of the plurality of entries comprises a noun and one or more synonyms of the noun; and
  - responsive to identifying, in the ontology, a particular entry that comprises a synonym matching the first entity, substituting the noun of the particular entry as the first entity;
- determining a first sentiment score for a first fragment comprising the first entity and a second sentiment score for a second fragment comprising the second entity, wherein each sentiment score indicates an emotion indicated by the respective entity, wherein determining the sentiment score for each fragment comprises:
  - determining a keyword sentiment score for each keyword of a plurality of keywords in the fragment, wherein the keyword sentiment score indicates whether the keyword signifies positive or negative sentiment;
  - determining, from the plurality of keywords, an average keyword sentiment score; and
  - identifying the average keyword sentiment score as the sentiment score; and
- responsive to determining that the first sentiment score and the second sentiment score indicate opposite emotions, identifying the text as comprising hypocrisy and providing the text to an external device.

8. The non-transitory computer-readable storage medium of claim 7, wherein when executed by the processing device, the program instructions cause the processing device to perform operations comprising, for each entry:
- providing the respective entity to a search engine;
- receiving, from the search engine, an additional entity that is a synonym of the entity; and
- adding the additional entity to a synonym in the respective entry.

9. The non-transitory computer-readable storage medium of claim 7, wherein when executed by the processing device, the program instructions cause the processing device to perform operations comprising providing one or more of the first entity and the second entity to the external device.

* * * * *

UNITED STATES PATENT AND TRADEMARK OFFICE
CERTIFICATE OF CORRECTION

PATENT NO. : 11,580,298 B2
APPLICATION NO. : 17/084116
DATED : February 14, 2023
INVENTOR(S) : Boris Galitsky Page 1 of 2

It is certified that error appears in the above-identified patent and that said Letters Patent is hereby corrected as shown below:

On the Title Page

On page 2, Column 2, item (56) under Other Publications, Lines 43-44, delete "forSembanking"," and insert -- for Sembanking", --, therefor.

On page 3, Column 1, item (56) under Other Publications, Line 22, delete ""Mutaphrase:" and insert -- "Metaphrase: --, therefor.

On page 3, Column 2, item (56) under Other Publications, Line 29, delete "Economics,," and insert -- Economics, --, therefor.

In the Drawings

On sheet 5 of 24, in FIG. 5, under Reference Numeral 502, Line 1, delete "Copr" and insert -- Corp --, therefor.

In the Specification

In Column 11, Line 17, delete "are.""" and insert -- are." --, therefor.

In Column 13, Line 62, after "truck""" insert -- . --, therefor.

In Column 17, Line 38, delete "1908." and insert -- 1908 --, therefor.

In Column 19, Line 29, delete "sustain." and insert -- sustain). --, therefor.

In Column 20, Line 30, delete "a an" and insert -- an --, therefor.

In Column 22, Line 26, after "R1)" insert -- ^ --, therefor.

Signed and Sealed this
Twenty-sixth Day of December, 2023

Katherine Kelly Vidal
*Director of the United States Patent and Trademark Office*

CERTIFICATE OF CORRECTION (continued)
U.S. Pat. No. 11,580,298 B2

In Column 26, Line 19, after "me," delete "Identifying", therefor.

In Column 26, Line 20, before "Classes" insert -- Identifying --, therefor.

In Column 29, Line 2, delete "Omar)" and insert -- Omar --, therefor.

In Column 30, Line 2, delete "evangelica's" and insert -- evangelical's --, therefor.

In Column 33, Line 62, delete "")." and insert -- ". --, therefor.

In Columns 33-34, Line 43, delete "it 's" and insert -- it's --, therefor.

In Column 37, Line 38, delete "sj))" and insert -- sj). --, therefor.

In Column 47, Line 59, delete "computer readable" and insert -- computer-readable --, therefor.